United States Patent [19]

Yoshida et al.

[11] Patent Number: 5,038,728
[45] Date of Patent: Aug. 13, 1991

[54] METHOD & APPARATUS FOR MANAGING ALTERNATOR LOADS ON ENGINES

[75] Inventors: Louis T. Yoshida; James M. Forbis, both of Longmont; Robert L. Poland, Boulder, all of Colo.

[73] Assignee: Nutronics Corporation, Longmont, Colo.

[21] Appl. No.: 470,432

[22] Filed: Jan. 24, 1990

Related U.S. Application Data

[63] Continuation of Ser. No. 198,490, May 25, 1988, abandoned, which is a continuation-in-part of Ser. No. 74,776, Jul. 17, 1987, abandoned.

[51] Int. Cl.$^5$ .............................................. F02R 77/00
[52] U.S. Cl. ................................ 123/198 R; 123/339; 320/72
[58] Field of Search .............. 123/339, 198 R, 198 D; 310/102 R, 113, 273; 320/72; 171/313; 180/65; 364/431.03

[56] References Cited

U.S. PATENT DOCUMENTS

| | | | |
|---|---|---|---|
| 2,247,814 | 7/1941 | Lamborn | 171/313 |
| 2,724,085 | 11/1955 | Charbonneau | 322/29 |
| 3,171,505 | 3/1965 | Imelmann | 180/65 |
| 3,530,356 | 9/1970 | Aronson | 320/61 |
| 3,792,742 | 2/1974 | Mager | 180/65 |
| 3,899,041 | 8/1975 | Mager | 180/65 |
| 3,918,543 | 11/1975 | Halem | 180/77 |
| 4,155,225 | 5/1979 | Upchurch, Jr. | 123/198 R |
| 4,206,613 | 6/1980 | Shocklay | 123/198 R |
| 4,300,088 | 11/1981 | Hicks | 320/61 |
| 4,610,146 | 9/1986 | Tanemura | 123/198 R |
| 4,617,890 | 10/1986 | Kobayashi et al. | 123/339 |
| 4,625,281 | 11/1986 | Deutsch | 364/431.02 |
| 4,625,697 | 12/1986 | Hosaka | 123/478 |
| 4,688,530 | 8/1987 | Nishikawa et al. | 123/198 R |
| 4,700,674 | 10/1987 | Iwata | 123/327 |
| 4,702,210 | 10/1987 | Yasuoka et al. | 123/339 |
| 4,733,540 | 3/1988 | Sakurai | 123/198 R |

FOREIGN PATENT DOCUMENTS

| | | | |
|---|---|---|---|
| 0009895 | 7/1979 | European Pat. Off. | 123/198 R |
| 0201243 | 4/1986 | European Pat. Off. | 123/198 R |
| 2848556 | 9/1978 | Fed. Rep. of Germany | 123/198 R |
| 61-171840 | 2/1986 | Japan | 123/198 R |
| 2039172 | 9/1978 | United Kingdom | 123/198 R |

Primary Examiner—Raymond A. Nelli
Attorney, Agent, or Firm—James R. Young

[57] ABSTRACT

The improved engine load management system of the present invention includes an apparatus that will de-excite the field coils of an alternator that is driven by an internal combustion engine when the battery that the alternator charges is above a required minimum voltage and when the engine is operating under high load conditions such as acceleration or climbing. When the battery charge falls below the required minimum, the apparatus excites the alternator field coils and permits the alternator to charge the battery despite a high engine load condition. When the battery charge is above the minimum required voltage, but below the voltage at which charging is discontinued, and the engine is under high load, the alternator field coils are energized and de-energized in a cycle that reduces alternator drag on the engine, but permits limited battery charging to occur. The limited charging rate is greater as the battery voltage is lower, and the change from lesser battery charging to greater battery charging is linear and inversely related to the charge of the battery. When the engine is operating at normal load conditions, such as cruise, battery charging is accomplished on demand under normal circumstances. Deferring battery charging by limiting alternator field coil excitation, reducing alternator drag on the engine during heavy load conditions (an inherently inefficient operating regime for internal combustion engines) increases fuel economy and decreases atmospheric pollutants from automobiles equipped with the apparatus of the current invention.

35 Claims, 13 Drawing Sheets

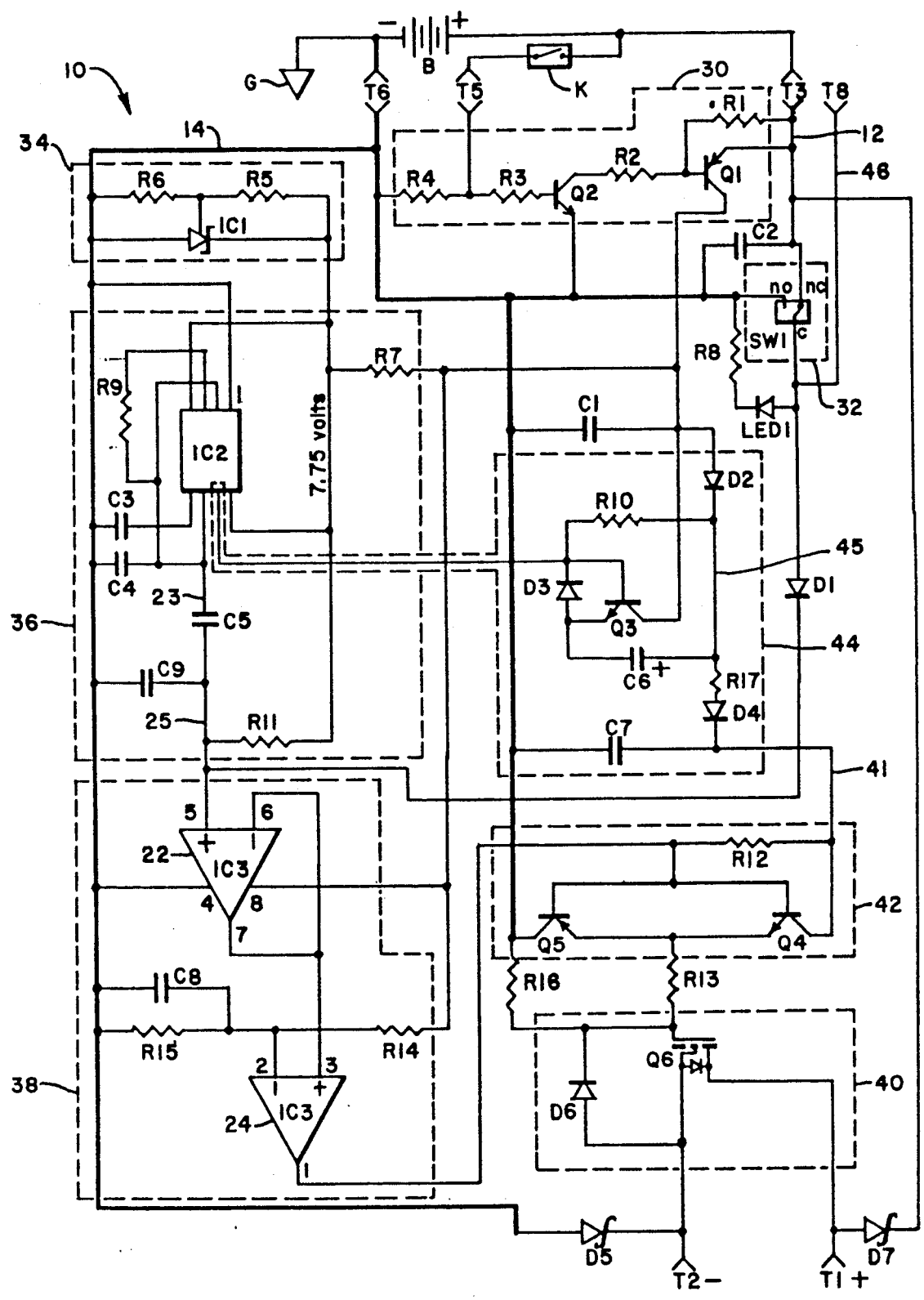
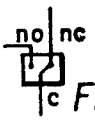
FIG. 4
FIG.4a  FIG.4b  FIG.4c  FIG.4d

METHOD & APPARATUS FOR MANAGING ALTERNATOR LOADS ON ENGINES

CROSS-REFERENCE TO RELATED APPLICATION

This patent application is a continuation of patent application Ser. No. 07/198,490, filed May 25, 1988, now abandoned, which is a continuation -in-part of Patent application, Ser. No. 07/074,776, filed July 17 1987, now abandoned.

BACKGROUND OF THE INVENTION

1. FIELD OF THE INVENTION

The present invention relates generally to motor vehicle economizing devices, and it relates more specifically to methods and apparatus for disabling a battery charging system when the vehicle's engine is under load and the battery is already charged to a predetermined threshold level.

2. DESCRIPTION OF PRIOR ART

The general principles of internal combustion engines are widely known, including the fact such engines have a characteristic curve that relates the brake horsepower of the engine to the engine RPM (revolutions per minute). At low RPM, the available brake horsepower is only a small fraction of the total horsepower that the engine can develop. When the engine is operated under heavy load, especially at low RPM, such as occurs when an engine-powered vehicle is accelerating from a full stop, or during rapid acceleration of the vehicle from a moderate speed to a relatively high speed, or when operating the vehicle for a prolonged period under conditions that resemble acceleration demands, such as climbing steep hills, the engine is operating at an inherently inefficient condition. Under such inefficient conditions, more fuel is added to the engine to increase its horsepower output. However, a significant portion of the fuel is not burned, resulting in both wasted fuel and high atmospheric pollution by the vehicle's exhaust gas. Any load component or drag that can be removed from the engine during its operation in such an inefficient condition will allow the engine to achieve a more efficient and cleaner operation sooner.

In actual use, few auxiliary loads which an engine drives in a conventional motor vehicle are necessary on a continuous basis. By coordinating these loads with the operating regime of the engine, engine efficiency can be improved and pollution reduced.

Many control devices for automobile engines exist. Some of such devices attempt to achieve smooth, stable, or efficient engine operation. Some attempt to increase gasoline mileage, while others attempt to reduce pollution. A few devices attempt to decrease engine loads under certain conditions. None of such previous devices known to these inventors has attempted to eliminate or reduce a primary source of drag on the engine that exists in nearly every automobile or truck that uses an internal combustion engine, that of the alternator or generator.

SUMMARY OF THE INVENTION

Accordingly, it is a general object of the present invention to provide a novel method and apparatus for reducing drag on an internal combustion engine in automobiles or other vehicles when the engine is operating in an inefficient realm of its horsepower range by disconnecting the source of electrical power from the engine output, thereby improving fuel economy and reducing atmospheric pollution from the engine's exhaust.

Further, it is a general object of the present invention to provide a method and apparatus for reducing drag on an internal combustion engine when said engine is operating in an inefficient realm of its horsepower range by reducing the load on the engine created by the source of electrical power during those times that battery charge state does not require full output of the source of electrical power, thereby improving fuel economy and reducing atmospheric pollution from the engine's exhaust.

A specific object of the present invention is to provide a method and apparatus for sensing engine load conditions and battery charge state, and to provide means for eliminating the charging of the battery when the battery charge state permits, while the engine is operating under heavy load conditions.

Yet another specific object of the present invention is to provide a method and apparatus for sensing engine load conditions and battery charge state, and to provide means for reducing the charging of the battery when the battery charge state requires only partial charging, while the engine is operating under heavy load conditions.

It is also a specific object of the present invention is to provide a method and apparatus for providing full charging of the battery when the battery charge state requires, although the engine is operating under heavy load conditions.

Still another specific object of this invention is to provide a method and apparatus for providing the proper battery charging, ranging from no charge through partial charging to full charging, by controlling the alternator field voltage.

A more specific object of the present invention is to provide a method and apparatus for decreasing alternator output in linear fashion based on interim charge states of the battery, while the engine is operating under heavy load conditions.

A further object of the present invention is to provide a method and apparatus for deferring alternator drag for battery charging and accessory power until such time as the engine is operating efficiently.

It is yet another specific object of the present invention to ensure adequate battery charging is accomplished despite steps to reduce alternator drag on the engine during heavy load conditions.

A further general object of the present invention is to provide an Engine Load Management System that is adaptable to a wide range of designs of alternator systems.

Additional objects, advantages, and novel features of the present invention shall be set forth in part in the description that follows, and in part will become apparent to persons skilled in the art upon examination of the following description or may be learned by the practice of the invention. The objects and advantages of the invention may be realized and attained by means of the instrumentalities and in combinations particularly pointed out in the appended claims.

To achieve the foregoing and other objects and in accordance with the purpose of the present invention as embodied and broadly described herein, the method of this invention may comprise the steps of reducing drag on an internal combustion engine operating under heavy load conditions by sensing the vacuum in the engine manifold; using the sensed vacuum to operate a switch that activates an electronic circuit that develops electrical pulses that in turn cause excitation and de-excitation of the alternator; said electrical circuit also sensing the charge state of the battery, and applying pulses that cause the alternator to charge the battery under predetermined battery charging state conditions; and said electrical circuit also applying pulses that cause the alternator not to charge the battery under other predetermined battery charging state conditions.

The apparatus of this invention may comprise a variety of electronic circuit means for sensing battery charge state and engine load conditions; means for computing and determining appropriate output signals to the alternator field coils; and means to cause the alternator to fully charge, partially charge, or not to charge, the battery depending on the state of the battery charge.

BRIEF DESCRIPTION OF THE DRAWINGS

The accompanying drawings, which are incorporated in and form a part of the specification illustrate the preferred embodiments of the present invention, and together with the description serve to explain the principles of the invention. In the drawings:

FIG. 4 is a schematic diagram of a first preferred embodiment of the engine load management system configured for externally-regulated alternator systems, such as those typically used in automobiles manufactured by Ford Motor Company and Chrysler Corporation;

FIG. 4a illustrates a bare board vacuum switch position from the vacuum witch found in the schematic drawing shown in FIG. 4;

FIG. 4b illustrates an engine off vacuum switch position from the vacuum switch found in the schematic drawing shown in FIG. 4;

FIG. 4c illustrates a low vacuum, engine on vacuum switch position from the vacuum switch found in the schematic drawing shown in FIG. 4;

FIG. 4d illustrates a high vacuum, engine on vacuum switch position from the vacuum switch found in the schematic drawing shown in FIG. 4;

FIG. 8a illustrates a bare board vacuum switch position from the vacuum switch found in the schematic drawing in FIG. 8;

FIG. 8b illustrates an engine off vacuum switch position from the vacuum switch found in the schematic drawing in FIG. 8;

FIG. 8c illustrates a low vacuum, engine on vacuum switch position from the vacuum switch found in the schematic drawing in FIG. 8;

FIG. 8d illustrates a high vacuum, engine on vacuum switch position from the vacuum switch found in the schematic drawing in FIG. 8;

FIG. 10a illustrates a bare board vacuum switch position from the vacuum switch found in the schematic drawing in FIG. 10;

FIG. 10b illustrates an engine off vacuum switch position from the vacuum switch found in the schematic drawing in FIG. 10;

FIG. 10c illustrates a low vacuum, engine on vacuum switch position from the vacuum switch found in the schematic drawing in FIG. 10;

FIG. 10d illustrates a high vacuum, engine on vacuum switch position from the vacuum switch found in the schematic drawing in FIG. 10;

DETAILED DESCRIPTION OF THE PREFERRED EMBODIMENTS

Figure 1:
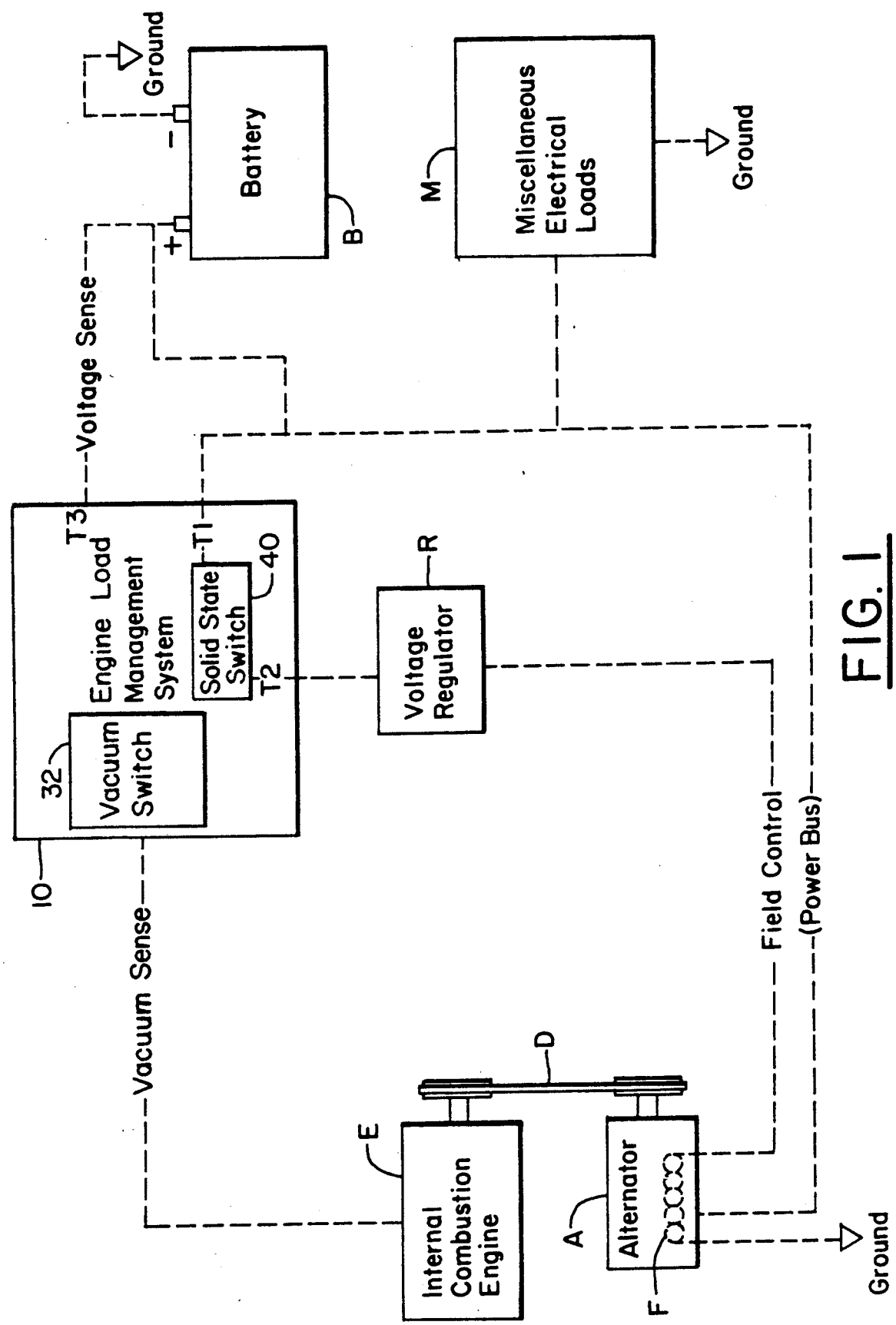
FIG. 1 is a diagrammatic representation of the first preferred embodiment of the engine load management system of this invention shown in relationship to an alternator system characterized by those typically used in Ford Motor Company automobiles.

A first embodiment 10 of an engine load management system according to this invention, for use in automotive alternator systems characterized by those typically used by Ford Motor Company and Chrysler Corporation, according to the principles of and to facilitate the practice of the present invention, is shown in FIGS. 1-5. The principles of the operation of the engine load management system 10 will be described in more detail below. However, for purposes of a general description of the major components, the first preferred embodiment 10 of the engine load management system according to this invention is shown in FIG. 1 adapted for use with an external regulator alternator system typical of those used in automobiles manufactured by Ford Motor Company. As shown in FIG. 1, the typical carburated internal combustion engine E drives an alternator A, usually by means of a belt drive D. The field coils or windings F are electrically excited by the battery B through a field control line. The typical voltage regulator R installed in the field control line keeps the alternator A from overcharging the battery B, and the charge output from the alternator A is carried on a power bus to the battery B and to the various miscellaneous electrical loads M of the automobile equipment and accessories.

Figure 2:
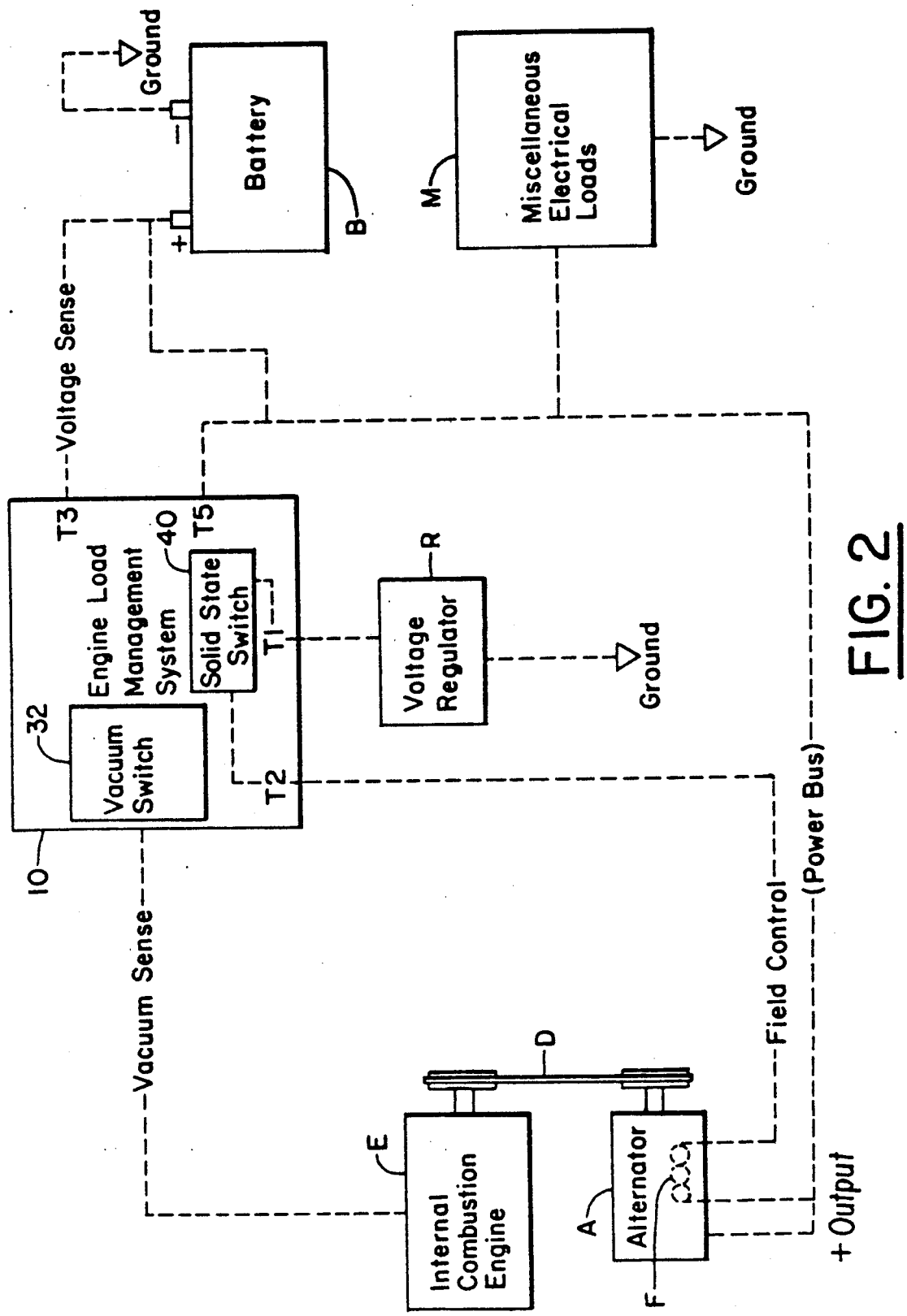
FIG. 2 a diagrammatic representation of the first preferred embodiment of the engine load management system of this invention shown in relationship to an alternator system characterized by those typically used in Chrysler Corporation automobiles.

The typical Chrysler (trademark) system illustrated in FIG. 2 is much the same as the typical Ford (trademark) system illustrated in FIG. 1. However, in the Ford (trademark) system of FIG. 1, the voltage regulator R is connected in series between the battery B and field F, whereas in the Chrysler (trademark) system of FIG. 2 of the regulator R is connected in series between the field F and ground.

The load management system 10 according to this invention senses both manifold vacuum from the engine E (indicative of engine load) and battery voltage, and it controls a solid state switch 40 to activate and deactivate the alternator field windings to selectively enable and disable the alternator A charging system. In ideal conditions, the alternator A charging system is disabled when the engine is under a heavy load, and it is enabled or allowed to charge in the normal manner when the engine is only lightly loaded or idling. However, in a critical range or condition of discharge, as will be described in more detail below, the extent to which the alternator is allowed to charge under loaded engine conditions varies in inverse proportion to condition of charge or discharge of the battery.

The engine load management system 10 in the Ford (trademark) system of FIG. 1 is shown positioned in the field control between the voltage regulator R and the battery B. In the Chrysler (trademark) system of FIG. 2, the engine load management system 10 is shown positioned in the field control line between the field F and the voltage regulator R. Of course, other locations may also be used for the load management system 10, as will become apparent to persons skilled in this art as they come to understand the operative principles of this invention from the description provided herein. The load management system 10 can be connected into the vehicle's field control line via terminals T1 and T2 provided for that purpose.

Figure 3:
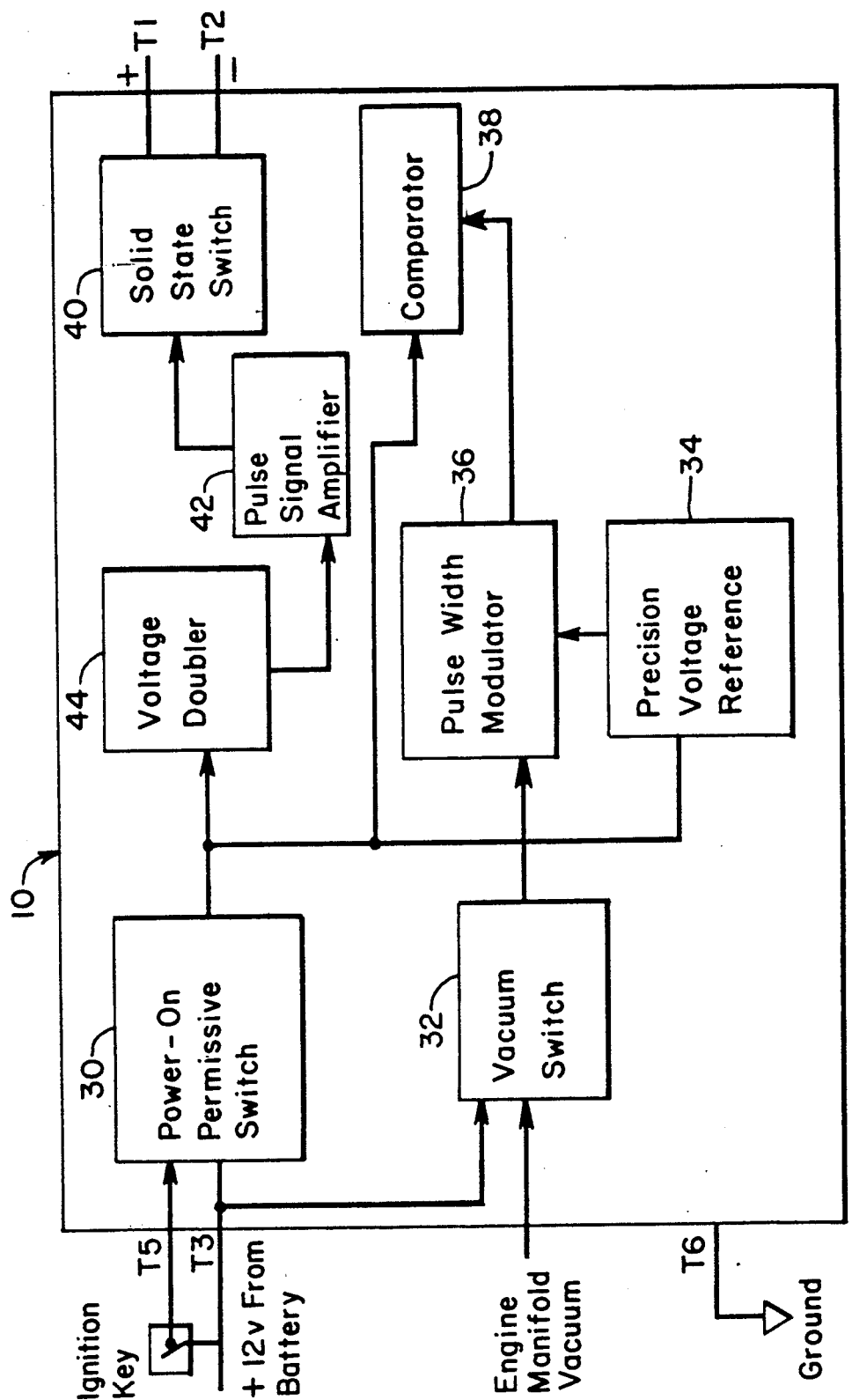
FIG. 3 is a functional block diagram of the engine load management system of this invention as configured for alternator systems typical of those used in Ford Motor Company and Chrysler Corporation automobiles.

The principle components of the load management system 10 according to this invention and the interrelated operational functions are best described by reference to FIG. 3. The power-on permissive switch 30 allows the load management system to energize and de-energize remotely by the conventional key-operated automobile ignition switch. It may be connected to battery supply voltage by a terminal connector T3 and to the ignition key switch by a terminal T5. Ground connection to all the components of the load management system 10 can be made by a terminal T6. When actuated by the ignition key switch, the power-on permissive switch 30 provides battery power to the precision voltage reference circuit 34, the comparator circuit 38, and the voltage doubler circuit 44. The vacuum switch 32 could also be powered through the power-on permissive switch 30; however, that is not necessary because the vacuum switch 32 opens the circuit when manifold vacuum from the engine is low. Therefore, when the engine is not running, thus no manifold vacuum present, the circuit through the vacuum switch 32 is opened automatically anyway.

The precision voltage reference circuit 34 provides a constant voltage reference rail from which the pulse width modulator 36 produces a precision triangle wave, as will be described in more detail below. The comparator circuit 38 compares representative battery voltage to the triangle wave and produces a pulsed high/low control signal that varies in proportion to the condition of charge or discharge in a selected critical range, but which is constant high or low below or above the critical range. When the engine is not loaded heavily or is idling, manifold vacuum is high, which closes the vacuum switch 32 to provide a direct voltage from the battery to swamp the precision triangle wave produced by the pulse width modulator 36. The result is that when the engine is not under heavy load, the signal put out by the comparator 38 calls for full, normal alternator operation and charging.

However, when the engine is under heavy load, three primary conditions can occur. First, if the battery already has a sufficient charge, the signal put out by the comparator 38 disables the alternator so that it does not charge. Second, if the battery is not fully charged or is discharging in a range below a selected high level or alternator disabling threshold, the signal put out by the comparator 38 calls for some charge by the alternator, the extent of which varies in inverse proportion to the battery charge condition or voltage level. Third, if the battery charge condition falls below a selected low level threshold, then the signal put out by the comparator 38 calls for full capacity charging by the alternator, regardless of the load already on the engine.

The range between the high level or threshold and the low level threshold described above can be set somewhat arbitrarily, but it is preferred to include a range around the design operating voltage of the vehicle's electrical accessories, i.e., around 12 volts in most automobiles currently in use. In the example that will be described below, a range between 12.6 v and 11.9 v is selected as the critical or proportional charging range.

The solid state switch circuit 40 chosen for the example to be described below and used in this invention includes a MOSFET transistor, which requires a higher voltage for operation than is put out by the comparator circuit 38. Therefore, a pulse signal amplifier circuit 42 is provided to amplify the signal put out by the comparator 38. A voltage doubler circuit 44 is used to provide a sufficiently high voltage to drive the amplifier 42 and operate the solid state switch 40. The alternator field control line is connected to switch 40 by terminal connectors T1 and T2, as shown in FIGS. 1 and 2.

Referring now to FIG. 4 for a more detailed description of the circuits and functional components of the load management system 10, battery power is input to the supply rail 12 at terminal T3, which for purposes of this illustration is assumed to be conventional positive and connected to the automobile battery B. The ground rail 14 is connected at terminal T6 to ground G. Keyswitch terminal T5 is also connected through the automobile key switch K to the positive side of automobile battery B.

When battery power is applied to keyswitch terminal T5, transistor Q2 turns on and pulls its collector to ground. The resulting current drain through resistor R2 causes the PNP transistor Q1 to turn ON and apply power to a programmable zener integrated circuit IC1, such as a Motorola (trademark) TL431LCP, which functions as an adjustable shunt regulator, also referred to herein as the precision voltage reference regulator 34. Essentially IC1 is set to provide a constant voltage, such as 2.5 v in the present example, at the point between the voltage divider resistors R5 and R6. Resistors R5, R6, R7, R9, and R10 function together as a resistor network and are sized to obtain the values and signals to accomplish the functions of this circuit to be described in more detail below.

A precision voltage signal, preferably 7.75 volts DC for this example, is established on rail 20 by voltage divider resistors R5, R6 and integrated circuit IC1. This precision voltage signal on rail 20 and a timer integrated circuit IC2, e.g., a National Semiconductor (trademark) LM555, in conjunction with an AC voltage divider comprised of capacitors C5 and C9, are used to create a triangle wave that varies over a range of 0.2 volts on line 25 centered at the bias level of 7.75 volts. Essentially, integrated circuit IC2 generates a triangle wave having a minimum voltage of one-third the applied 7.75 volts from rail 20 and a maximum of two-thirds the 7.75 volts. The resulting triangle wave output on line 23 by IC2 in this example, as illustrated in FIG. 5b varies from a minimum of approximately 2.5 volts to a maximum of approximately 5.0 volts. This triangle wave is then reduced by a ratio of 10:1 by the AC voltage divider formed by capacitors C5 and C9 to result in a reduced triangle wave that varies between a minimum of about 0.25 volts and a maximum of about 0.5 volts. In other words the resulting triangle wave varies over a range of approximately 0.2 volts. This reduced 0.2 volt triangle wave is then biased on line 25 by the precision 7.75 volts from rail 20 to produce the triangle wave shown in FIG. 5c, which is centered on the bias voltage of 7.75 volts and varies between a minimum of about 7.65 volts and a maximum of about 7.85 volts. Capacitor C4 functions in combination with AC divider capacitors C5 and C9 as a low pass filter network. Resistor R11 sets the bias level of the op-amp stage 22 of IC3 at pin 5.

Figure 5A:
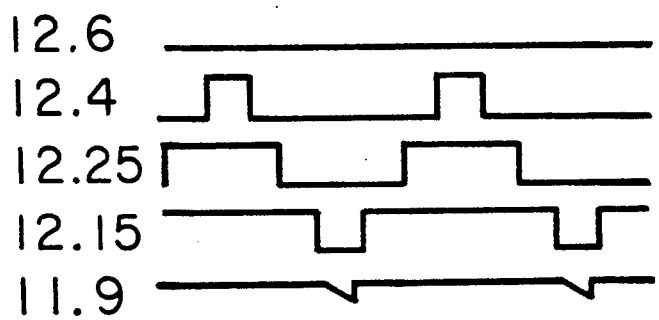
FIG. 5a illustrates examples of pulse signals generated by the comparator circuit of this present invention based upon a comparison of a divided battery voltage and a precision voltage reference.
Figure 5B:
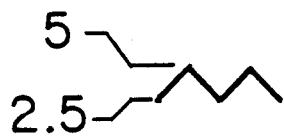
FIG. 5b illustrates an example triangle wave as generated within the pulse width modulator of this invention which is functionally depicted in FIG. 3 and schematically depicted in FIG. 4.
Figure 5C:
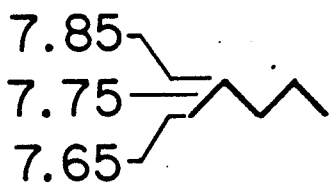
FIG. 5c illustrates a biased triangle wave as generated by the pulse width modulator of this invention which is functionally depicted in FIG. 3 and schematically depicted in FIG. 4.

The biased triangle wave signal of FIG. 5c is applied to pin 5 on the op-amp stage 22 of integrated circuit IC3, e.g., National Semiconductor (trademark) LM392, where it is buffered and then sent to pin 3 of the comparator stage 24 of integrated circuit IC3. Since the op amp stage 22 of IC3 is a unity gain amplifier in this example, the output on pin 6 is the same biased 7.65 v to 7.85 v triangle wave as applied to input pin 5. Therefore, this same biased triangle wave is also applied to pin 3 of the comparator stage 24 of IC3.

The comparator stage 24 of IC3 compares the triangle wave signal at pin 3 to a reference voltage derived from and directly related to the battery voltage at pin 2 and generates a pulsed waveform with a time duration of each pulse that is directly related to the difference between the reference voltage and the triangle wave voltage.

More specifically, the voltage divider formed by resistors R14 and R15 is designed to provide a reference voltage on pin 2 that is proportional to the actual battery voltage, but more in the range of the biased triangle wave on pin 3. In the example being used here, a battery voltage of about 12.6 v results in a voltage on pin 2 of about 7.85 v, and a battery voltage of 11.9 v results in a voltage of about 7.65 v on pin 2. The comparator stage 24 of IC3 can essentially be an ON/OFF comparator with an open collector, i.e., it has an internal switch that can connect pin 1 to ground. Since op amp stage 22 and comparator stage 24 are both part of the same IC3, the connections of pin 1 to ground are internal and not shown explicitly in FIG. 4. When the voltage on pin 3 matches the voltage on pin 2, the comparator stage 24 turns the internal switch on pin 1 to ground on or off, depending on whether the triangle wave voltage on pin 3 is rising or falling when the match occurs. When the comparator 24 switches pin 1 to ground, the output on pin 1 is, of course, 0 v, i.e., low. When the comparator 24 does not have pin 1 switched to ground, the output on pin 1 is the same as the voltage on line 41, i.e., high.

The result is that when the battery voltage is at or below 11.9 v (divided down to 7.65 v or below on pin 2), the pin 1 is never switched to ground, and the output voltage on pin 1 is always high, as shown in FIG. 5a.

On the other hand, when the battery voltage is at or about 12.6 v (divided down to 7.85 v or above on pin 2), the comparator 24 always has pin 1 switched to ground, so the output on pin 1 is always low, as shown in FIG. 5a.

Figure 5D:
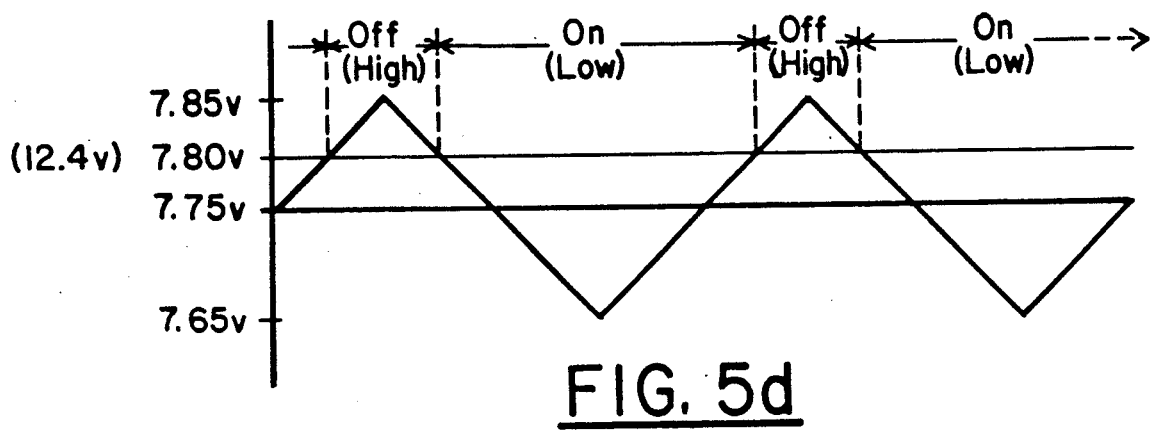
FIG. 5d illustrates the relationship between the biased triangle wave of FIG. 5d and the duration of high pulses as seen in FIG. 5a with a battery voltage of 12.4 v, as divided down to 7.80 v.

When the battery voltage is between 11.9 v and 12.6 v (divided down to between 7.65 v and 7.85 v on pin 2), the comparator 24 switches pin 1 back and forth between ground and the voltage on line 41, thus pulsing the output on pin 1 back and forth between low and high. The durations of the high and low output pulses on pin 1 depend on the divided down battery voltage level on pin 2 between the selected 7.65 v to 7.85 v boundaries of the proportional charging range. For example, as shown in FIG. 5d, when a battery voltage of about 12.4 v, divided down to a reference 7.80 v, is applied to pin 2, the internal switch to ground in comparator 24 is switched off, thus providing a high output on pin 1, whenever the biased triangle wave on pin 3 is above the 7.80 v on pin 2. However, the internal switch in comparator 24 is switched on to ground pin 1, thus providing a low output on pin 1, whenever the triangle wave voltage on pin 3 is lower than the reference 7.80 v. Therefore, at the battery voltage of 12.4 v, the pulsed output on pin 1 cycles between lows of longer duration and highs of shorter duration, as shown in FIGS. 5a and 5d.

Figure 5E:
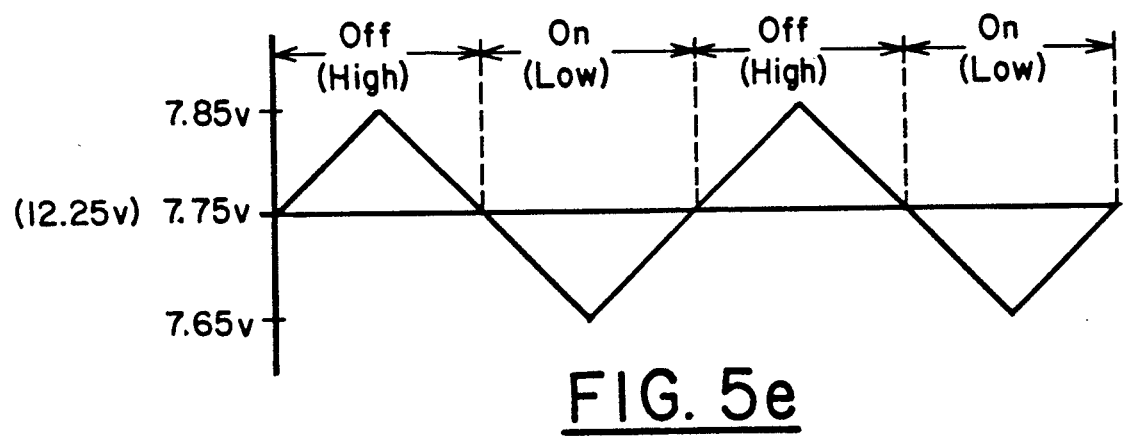
FIG. 5e illustrates the relationship between the biased triangle wave of FIG. 5c and the duration of high pulses as seen in FIG. 5a with a battery voltage of 12.25 v, as divided down to 7.75 v.

When the battery voltage drops down to about 12.25 v (divided down to a reference voltage of 7.75 v on pin 2, which is equal to the bias voltage of the triangle wave on pin 3), according to this example, the biased triangle wave is above the reference voltage on pin 2 for the same duration as it is below. Thus, the comparator 24 has pin 1 switched to ground for time intervals about equal to the time intervals it is not switched to ground. Therefore, the durations of the output pulse highs and lows on pin 1 are of about equal duration, as shown in FIGS. 5a and 5e.

Figure 5F:
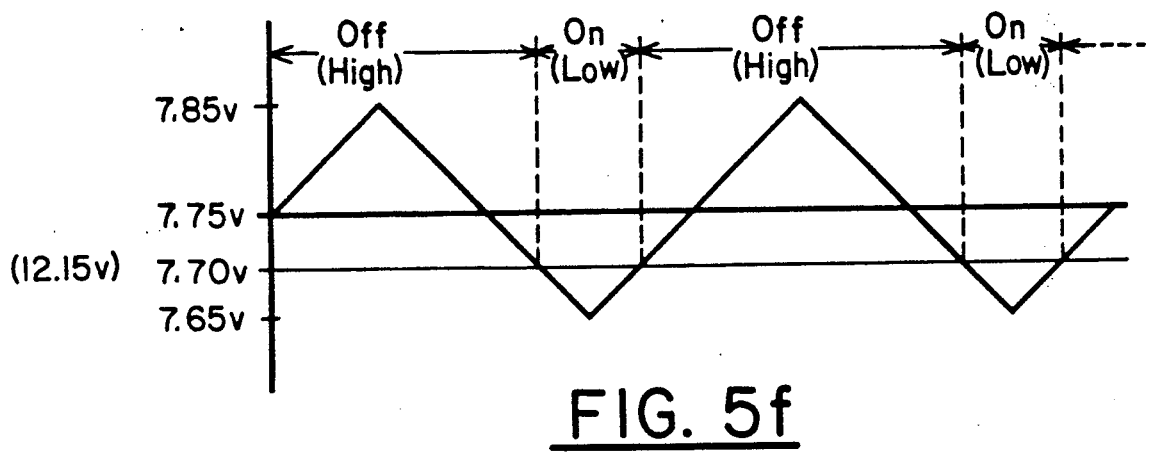
FIG. 5f illustrates the relationship between the biased triangle wave of FIG. 5c and the duration of high pulses as seen in FIG. 5a with a battery voltage of 12.15 v, as divided down to 7.70 v.

When the battery voltage drops even further, for example to 12.15 v (divided down to a reference 7.70 v on pin 2), as shown in FIG. 5f, the comparator has pin 1 switched to ground for even shorter durations as the biased triangle wave dwells below the reference 7.70 v. Therefore, the pulsed output signal on pin 1 cycles between a series of lows of shorter duration, as shown in FIGS. 5a and 5f and highs of longer duration.

The result of the operation of this comparator stage 24 is a pulse signal generated at pin 1, the width of which pulse varies from always low, if the battery voltage is above 12.6 Volts DC, to always high, if the battery voltage is below 11.9. Between the 12.6 v and 11.9 v range of the battery, the durations of the highs and lows of the pulsed signal output vary in direct proportion to the extent to which the actual battery voltage varies within that range. The highs become longer as the battery voltage approaches 11.9 v and shorter as the battery voltage approaches 12.6 v.

This pulse at pin 1 is used to drive MOSFET transistor Q6, which functions as the solid state switch 40. However, it takes at least 10 v to drive MOSFET Q6. Since IC3 pin 1 does not have enough power capability to drive the capacitive load at MOSFET Q6 the signal has to be amplified to enable it to drive MOSFET Q6. Therefore, the pulsed signal from pin 1 is amplified by an amplifier circuit 42, which is comprised of an NPN transistor Q4 and PNP transistor Q5.

Since the battery cannot provide a dependable high enough voltage to drive amplifier 42, a higher voltage supply is necessary. Such a higher voltage supply for amplifier 42 is provided in this example by the voltage doubler circuit 44. In the voltage doubler circuit 44, capacitor C6 is alternately charged to the battery voltage through D2, D3 and a transistor in IC2 pin 7 and then discharged by Q3 into line 45 to double the voltage in line 45. Capacitor C7 acts as a filter to smooth the voltage created by circuit 44. Resistor R17, in series with D4 serves to limit power to amplifier circuit 42 to improve reliability and protect transistor Q4. Transistor Q3 is cycled on and off, such as at a rate of 660 Hz, by an internal switch to ground in the timer IC2. Thus, the voltage supplied to amplifier circuit 42 by line 41 is about double the voltage of battery B.

The MOSFET transistor Q6 of switch 40 is connected in series with the alternator field F (not shown in FIG. 4) by means of connector terminals T1 and T2 for controlling the output of the alternator A (also not shown in FIG. 4). Connector terminals T1 and T2 are connected in series with the alternator field F, regulator R and battery B, as shown in FIG. 1 for alternator circuits typical of those used in Ford (trademark) automobiles and as shown in FIG. 2 for alternator circuits typical of those used in Chrysler (trademark) automobiles. Resistor R13 limits spurious oscillations. Resistor R16 drains capacitor C7 at shutdown to protect the transistor Q6.

The vacuum switch SW1 ultimately controls the output of the MOSFET transistor Q6, which in turn controls whether the vehicle's alternator A (not shown in FIG. 4) is charging the battery B. A throttled operating engine E (not shown in FIG. 4) under little load develops a high manifold vacuum, which pulls vacuum switch SW1 to its normally closed (NC) mode. This action sends the full voltage of battery B from T3 through Diode D1 to line 25, thereby swamping the previously described triangle wave of 7.65 v to 7.86 v and biasing pin 5 of IC3 above its linear operating point. The effect of this swamping is to drive the output of the op-amp stage 22 of integrated circuit IC3 to its maximum positive voltage (at pin 7).

In turn, when the output of the op-amp stage 22 of IC3 is fed to the comparator stage of IC3 at pin 3, the voltage on pin 3 is always higher than the divided down battery reference voltage at pin 2, so the output at pin 1 of comparator stage 24 of IC3 is held at a constant high signal. The resultant high signal output at pin 1 of IC3 turns transistor Q5 off and transistor Q4 on, thereby amplifying the high signal from pin 1 with the doubled voltage on line 41 and directing it to the gate of MOSFET transistor Q6. Thus, MOSFET transistor Q6 is biased and fully on when vacuum switch SW1 is in its normally-closed, high vacuum position. With MOSFET transistor Q6 on, the alternator field winding circuit (not shown) is closed through MOSFET transistor Q6 of solid state switch 40, thereby energizing the alternator field winding to cause alternator output for charging the battery B. Consequently, when the engine is operating under no load or light load conditions where manifold vacuum is high, the alternator field winding is always excited and the alternator always charges in a normal and conventional manner.

When an operating engine is operating under high loads, such as during acceleration, its manifold vacuum is low, which in turn pulls the vacuum switch SW1 of switch 32 to its normally open position. This in turn allows the triangle wave signal on line 25 to reach the op-amp stage 22 and pin 3 of comparator stage 24 of IC3 unaltered. The comparator circuit 38 is therefore allowed to function as described above to produce signals at pin 1, as illustrated in FIG. 5a.

More specifically, when the engine is under high load condition, if the battery B is fully charged, i.e., holds a voltage of 12.6 v or above, the output at pin 1 is a constant low. This low signal turns transistor Q4 in amplifier 42 off, and it turns PNP transistor Q5 on to pull the gate of MOSFET Q6 to a voltage below the source of Q6. This action unbiases and turns MOSFET Q6 off and effectively opens solid state switch 40, thus opening the alternator field winding circuit and preventing the alternator from charging. Thus, under loaded engine conditions with a fully charged battery B, the alternator is disabled so that it does not charge. When the alternator is not charging, it is not adding further load to the already loaded engine.

When the engine is still under load, but the battery is not fully charged or does not stay fully charged for the duration of the load on the engine, such as under a prolonged load with the head lights and other high-amperage electric accessories turned on, the alternator is allowed to charge, even if it does add more load to the already loaded engine. For example, as the battery voltage falls below the 12.6 v level, and the loaded engine has vacuum switch SW1 in its normally open position, the comparator stage 24 of IC3 begins to put out the pulsed square wave signals, such as those described above and illustrated in FIG. 5a. Those high and low pulsed signals cause the MOSFET Q6 in switch 40 to cycle the alternator field circuit open and closed, so that the alternator charges, but not at full capacity. The lower the battery voltage gets, the longer the alternator field circuit is closed, so the closer the alternator gets to full capacity charging. In this example, when the battery voltage falls to 11.9 v or below, the comparator stage 24 puts out a constant high signal, thereby holding MOSFET Q6 closed or on constantly. Thus, under such low battery conditions, the alternator field circuit is held constantly closed, and it puts out its full charge, regardless of engine load.

The increase or decrease in alternator charging, thus the power drain on the engine, is fairly linear through the abovedescribed 12.6 v to 11.9 v range due to the regular and constant slopes, i.e., rate of voltage increase and decrease, of the triangle wave form applied to pin 3 of comparator stage 24. This results in the direct proportional charging of the battery in inverse relation to battery voltage in that range.

The vacuum switch SW1 also controls LED1, providing indication of the vacuum status. Diodes D5, D6, and D7 provide for protection of the MOSFET Q6. The zener diode D6 can be set at about 14 v to keep the MOSFET bias less than its specification 20 v max. Schottky diode D7 drains to the battery B positive spikes that can occur upon opening the alternator field circuit, and Schottky diode D5 drains to ground negative spikes.

The line 46 to terminal T8 is auxiliary and can be used to connect the load controller of this invention to a throttle rod or other input control (not shown). This auxiliary connection can be used, for example, on a diesel engine that does not have any significant manifold vacuum so that vacuum switch SW1 would not be operable.

Figure 6:
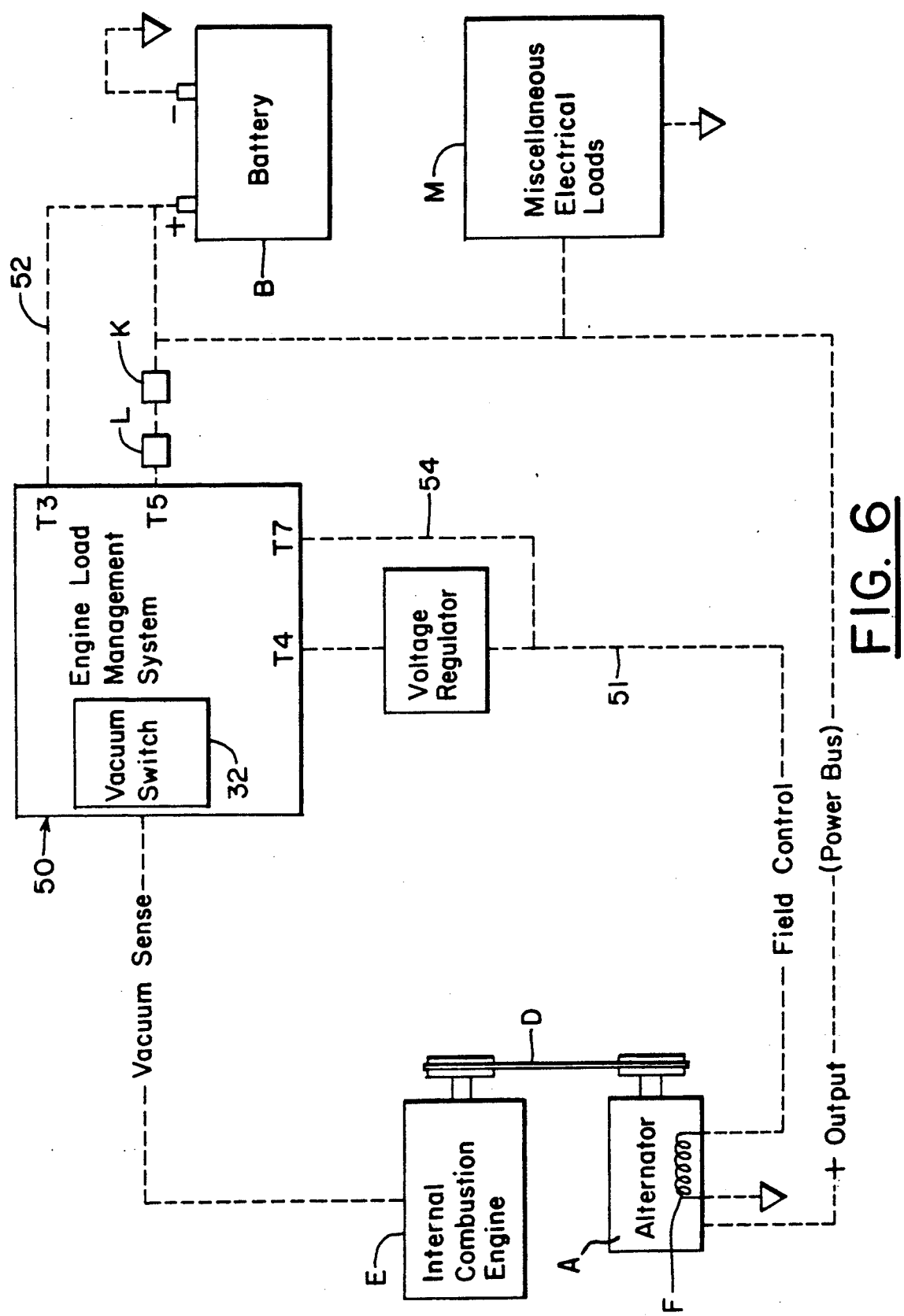
FIG. 6 is a diagrammatic representation of the second preferred embodiment shown in relationship to an alternator system characterized by those typically used in General Motors Corporation automobiles.
Figure 7:
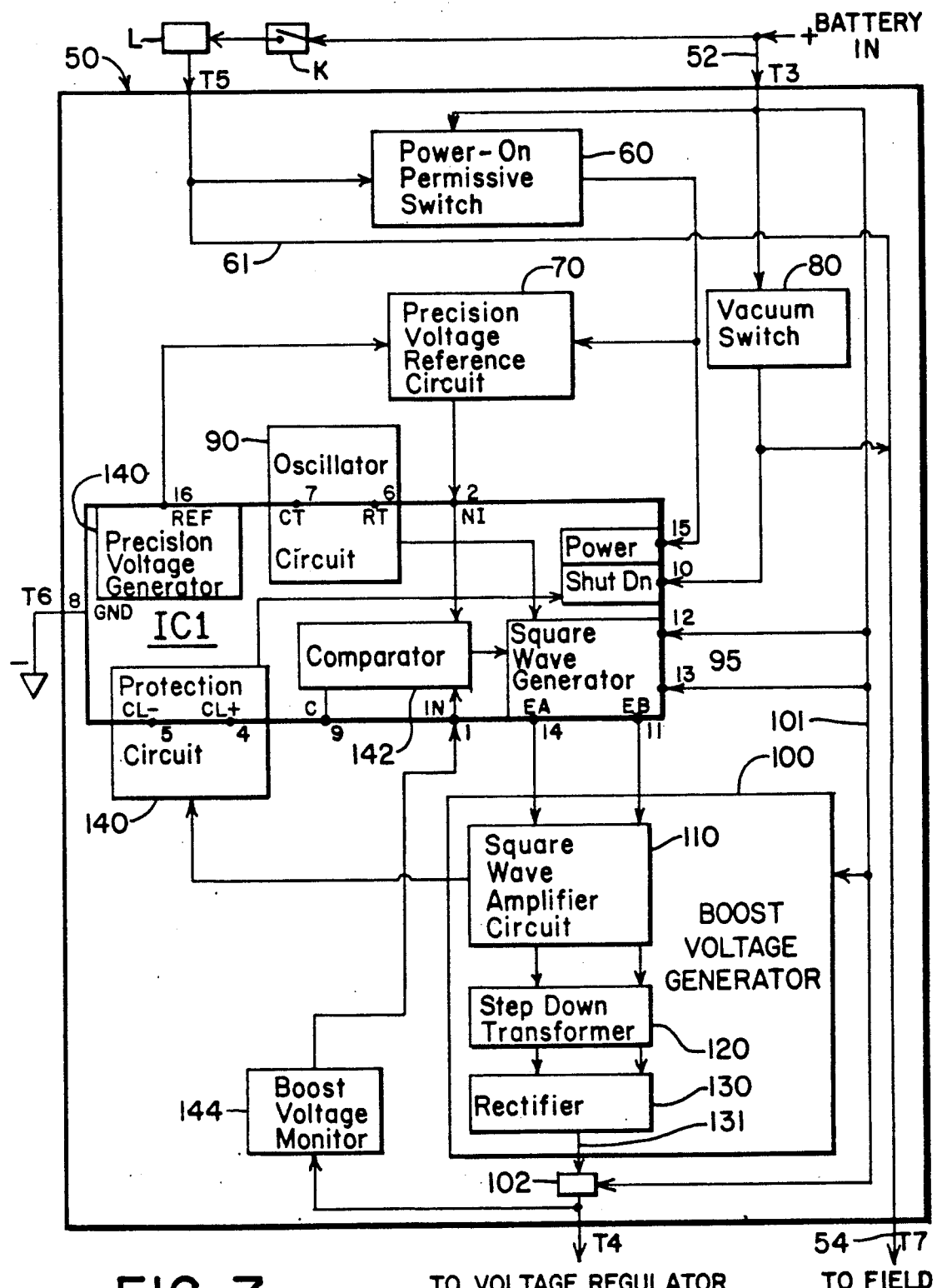
FIG. 7 is a functional block diagram of the second embodiment engine load management system shown in FIG. 6.
Figure 8:
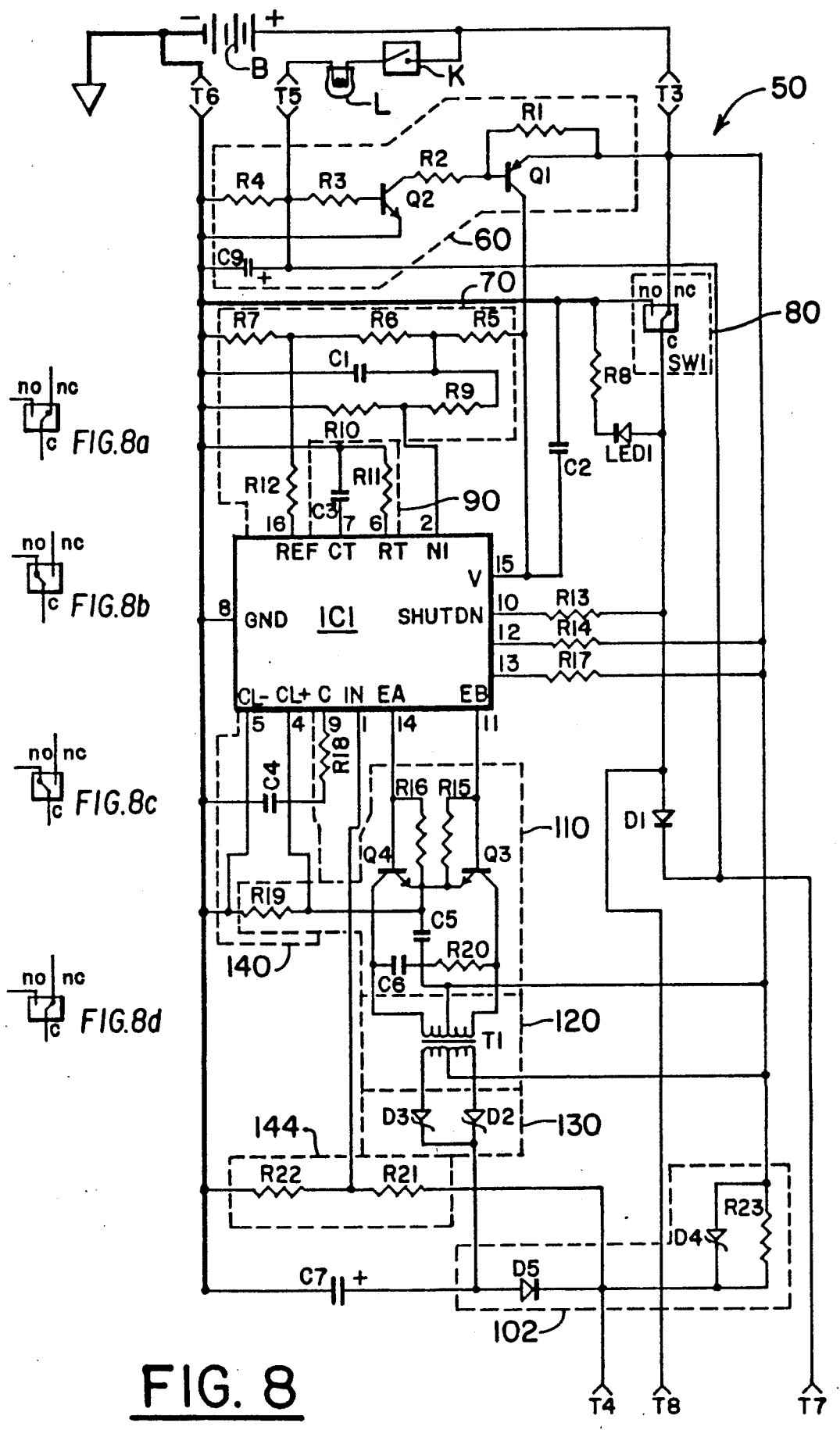
FIG. 8 is a schematic diagram of the second preferred embodiment of the engine load management system for internally-regulated alternator systems, such as those typically used by General Motors.

A second preferred embodiment 50 of the engine load management system according to this invention is illustrated in FIGS. 6-8. This load management system 50 is particularly adapted for use in alternator battery charging systems typical of those commonly installed in automobiles manufactured by General Motors Corporation and similar designs. In such systems, as generally shown in FIG. 6, the engine E typically drives an alternator A via a belt drive D. The alternator A generates electric power to charge the battery B and to operate the miscellaneous electrical loads M in the vehicle.

The field windings F in the alternator A in such a General Motors system is usually excited by a positive field control line 51 from the battery B. Normally leads 52 and 53 are one lead connecting the positive post of battery B to the voltage regulator R when the load management system 50 of the present invention is not installed in the vehicle. The voltage regulator R senses when the charge on the battery B falls below a threshold, usually about 14 v, and then closes the field control circuit to excite the field windings F so the alternator will charge. Some voltage regulators allow a proportional increase or decrease in the alternator charging capacity.

The voltage regulator R in General Motors vehicles is usually mounted internally in the alternator A, although it is shown as a separate component in FIG. 6 for convenience. Also, the field F is usually supplied with power internally from the charging alternator once the engine is running However, during engine start, the field F is initially excited from an external circuit through the ignition key switch K and an indicator light L on the vehicle dashboard or instrument panel. This external circuit 54 bypasses the voltage regulator R to the field control circuit 51 and is usually not interrupted by the load management system 50 of this invention in a conventional General Motors factory system.

The load management system 50 according to the present invention is preferably installed in the normal lead 52, 54 between the vehicle's battery B and voltage regulator R and in the starting circuit 51 after the key switch K and indicator light L, as shown in FIG. 6. Essentially, when the engine is under a heavy load, as sensed by a vacuum switch 32 in the load management system 50, the load management system can produce a higher voltage at terminal T4 than is actually being provided by the battery on terminal T3. This higher or "boosted" voltage essentially "fools" the voltage regulator R by presenting an "apparent" battery voltage to the voltage regulator R that is higher than the actual battery voltage really is, thus inducing the voltage regulator R to decrease or shut down the alternator A charging function. Of course, such decreased or shut down alternator charging decreases or eliminates the load on the engine that would normally be caused by the alternator A.

On the other hand, when the manifold vacuum from the engine is high, thus indicating the engine is not under heavy load, the load management system 50 presents approximately the same voltage on terminal T4 to the voltage regulator R as the actual battery voltage at terminal T3. Therefore, under such no load or light engine load conditions, the alternator charging system is allowed to function normally to maintain a full charge on the battery B.

The extent to which the voltage at terminal T4 is boosted under loaded engine conditions can be set or designed into the load management system at any arbitrary level desired. If the battery discharges more than this arbitrary "boost voltage" margin, the voltage regulator R will allow the alternator A to charge regardless of the load on the engine. In order to insure that there is always sufficient minimum threshold voltage to operate the normal vehicle electrical accessories, the illustrative circuit design example that follows herein sets the boost voltage at a level of about 1.85 v.

In some General Motors automobiles, once the field F is disabled, the alternator will not charge again until the engine speed gets up to a certain threshold RPM. Therefore, in order to preclude problems that could otherwise result from the alternator A being shut down under engine load by this load management system 50 and then not regenerating, or under low engine idle speeds, the load management system 50 can automatically apply a "start" voltage on the terminal T7 that mimicks the initial engine starting circuit. This mimicked "start" voltage on terminal T7, which can be triggered by a return to high vacuum, is directed through circuit 54 to excite the field F to get the alternator A regenerated to charge again.

Referring to FIG. 7, the load management system 50 includes a power-on permissive switch circuit 60, which, when actuated by power from the vehicle ignition key K through typically an indictor light L to terminal T5, provides power from the battery to the integrated circuit IC1 and to the precision voltage reference circuit 70. The lead 61 also bypasses power from the key switch K to the field through terminal T7 for the "start" circuit 54 described above.

A vacuum switch 80 that senses manifold vacuum from the vehicle's engine E (not shown in FIG. 7), applies battery voltage to the high/low shut down pin 10 of IC1. In other words, when engine vacuum is low due to a heavy load, the voltage on pin 10 is low and turns on IC1 to activate the load management system 50 as will be described in more detail below. When vacuum is high, indicating only light or no load on the engine, the vacuum switch 80 turns off the battery voltage so that pin 10 goes high and shuts down IC1, thus allowing the alternator to operate and charge in a normal manner. High vacuum also applies battery voltage to the "start" circuit 54 through terminal T7 to be sure the field F is excited after it is shut down by the load management system. This voltage is not limited by the indicator light L discussed above.

When IC1 is turned on by low vacuum, i.e., heavy engine load, an oscillator circuit 90 operates in conjunction with a square wave generator 95 in IC1 to produce a pulsed square wave output at pins 11, 14. This square wave is utilized by a boost voltage generator 100 to create the "boost" voltage. The boost voltage, as discussed above, is added to the actual battery voltage on lead 101 at junction 102 to produce an "apparent" battery voltage at terminal T4 that is higher than the actual battery voltage. This "apparent" battery voltage at terminal T4 "fools" the vehicle's voltage regulator into shutting down the field F in the alternator A (not shown in FIG. 7) when the engine E is loaded, even though the battery might not be fully charged.

The boost voltage generator 100 includes an amplifier circuit 110, which amplifies the square wave produced by the square wave generator in IC1. The amplified square wave is then stepped down in voltage by a step-down transformer circuit 120, biased with the battery voltage, and rectified by a rectifier circuit 130 to produce the desired boost voltage at line 131. This boost voltage on line 131 is added to the battery voltage on line 101 at the junction 102, as described above.

The boost voltage on line 131 is preferably held at a predetermined constant level, such as the 1.85 v used in the example of this description. Therefore, a control is provided to maintain the boost voltage at a constant level. The control in this example is provided by a precision voltage generator 140 in IC1, the precision voltage reference circuit 70, a comparator 142 in IC1, and a boost voltage monitor 144. The precision voltage generator section 140 of IC1 produces a constant precision voltage, such as 5.0 v in this example, which the precision voltage reference circuit 70 uses to produce a precision voltage reference at a predetermined desired level that varies in direct proportion to the battery voltage, such as about 3.5 v in this example. The boost voltage monitor 144 takes the boosted "apparent" voltage at terminal T4 and divides it down to a monitor voltage that should be equal to the precision voltage reference produced by the precision voltage reference circuit 70, i.e., about 3.5 v, when the boost voltage on line 131 is at the desired level, e.g., 1.85 v. The comparator section 142 of IC1 compares the voltage from the boost voltage monitor 144 with the precision reference voltage produced by the precision voltage reference circuit 70. If the voltage from the boost voltage monitor 144 is the same as the precision reference voltage, e.g., 3.5 v, then nothing is changed. However, if the comparator 142 finds these two voltages to be different, it causes the square wave generator 95 to adjust the duration of the square wave pulses in such a manner as to increase or decrease the boost voltage produced on line 131 enough to come back to the desired level, e.g., 1.85 v.

A protection circuit 140 is provided in conjunction with IC1 to protect the components of the circuit, such as the transistors in the square wave amplifier circuit 110, from overload and damage. Essentially, if the protection circuit 140 detects more than a threshold maximum voltage pulse produced by the amplifier 110, it causes IC1 to shut down for the duration of the pulse.

Of course, when the engine is not heavily loaded, so there is enough manifold vacuum to switch off the vacuum switch 80, the voltage on pin 10 of IC1 goes high and shuts down IC1. With IC1 shutdown, no boost voltage is generated at line 131, and the alternator charging system is allowed to operate in its conventional manner.

An example of a specific circuit designed to perform the functions described above is shown in FIG. 8. Battery power is connected to input connector terminal T3 of the load management system 50, and ground is applied to ground connector T6. Terminal T5 is also connected to battery power through the indicator light L and ignition key switch K. When battery power is applied to keyswitch terminal T5 by keyswitch K, transistor Q2 in the power-on permissive switch 60 turns on and pulls its collector to ground. The current through R2 causes PNP transistor Q1 to turn ON. When turned ON, transistor Q1 applies power to pin 15 of the integrated circuit IC1, which is a regulating pulse width modulator, such as type SG3524B, manufactured by Silicon General, or its functional equivalent, and to the resistors R5, R6, R7, R9, and R10 of the precision voltage reference circuit 70, which function together as a network to divide the battery voltage down to a selected precision reference voltage, such as approximately 3.5 vdc. This reference voltage varies as a function of actual battery voltage and is applied to the non-inverting input of the error amplifier stage at pin 2 of the regulating pulse width modulator IC1.

As discussed above, the boosted voltage at terminal T4 is controlled and monitored by the boost voltage monitor 144, which is comprised essentially of a voltage divider set up by resistors R21 and R22. These resistors are sized such that a boosted "apparent" voltage at terminal T4 equal to the actual battery voltage plus 1.85v results in a monitor voltage across R22 equal to the reference voltage applied to pin 2 of IC1, e.g., approximately 3.5 v. This monitor voltage from a point between R21 and R22 is applied to the inverting pin 1 of IC1.

The two inputs at pins 1, 2 of IC1 are compared in IC1, and the comparison is used to set the pulse width of the square wave produced by IC1 at the push-pull outputs, pins 11 and 14. The currents through resistors R14, R17 drive the transistors in IC1 that set up the square wave outputs on pins 11 and 14.

The square wave outputs on pins 11 and 14 drive the transistors Q3 and Q4 of the amplifier circuit 110, which powers the step-up output transformer T1. The amplifier circuit 110 in this example is necessary because the power at pins 11, 14 is insufficient to drive the transformer T1. The resistors R15, R16 drain the base bias on transistors Q3 and Q4 to speed up switching. Transistors Q3 and Q4 each amplifies opposite sides of the square wave output of pins 11, 14 of IC1. The amplified square wave passes to alternate sides of the center-tapped primary coil of transformer T1. Resistor R20 and capacitor C6 damp the output of transformer T1 to control ringing.

The center tap transformer T1 of the transformer circuit 120 produces about a 3.0 v half-cycle square wave in each half of the secondary winding. However, this 3.0 v output is biased by the battery voltage on the center tap. Therefore, the effective output of the transformer T1 is two half-cycle square waves, each being about 3.0 v higher than the actual battery voltage. The rectifier 130, comprised of two Schottky diodes D2, D3 rectifies and combines the two half-cycle square waves to produce a rectified boost voltage output. This rectified boost voltage output is smoothed by capacitor C7 and fed through diode D5 to output terminal T4.

The diode D4 in the junction 102 prevents the boost voltage at terminal T4 from shorting back to the battery. Also, while the output of transformer T1 is about 3.0 v higher than battery voltage, the drops through rectifier diodes D2, D3 and through diode D5, in conjunction with the battery voltage drop through diode D4 result in an effective boosted "apparent" voltage at terminal T4 of about 1.85 v higher than the actual battery voltage. Resistor R23 dissipates the boost voltage at T4 when the vacuum switch 80 shuts down IC1 and returns the alternator to normal operation.

IC1 is gated "on" by a ground less than 0.8 vdc and "off" by positive voltage greater than 1.4 vdc on pin 10. Therefore, when manifold vacuum in the engine gets low due to heavy engine loading, vacuum switch 80 closes and applies ground to pin 10 to turn on IC1. This action results in the boosted "apparent" voltage at terminal T4 to be about 1.85 v higher than actual battery voltage, thus "fooling" the voltage regulator into shutting down the alternator when it would not otherwise be shut down. On the other hand, when the manifold vacuum goes back up, the vacuum switch 80 switches pin 10 to battery voltage, thus shutting down IC1 and terminating the boost voltage so that the alternator will resume normal operation.

Resistor R18 and capacitor C4 act as compensation for the error amplifier stage of IC1. Emitter resistor R19, which can also be considered part of protection circuit 140, sets up a current limit voltage drop for IC1, the threshold of which is 200 millivolts (mv) Essentially, this protection circuit 140 senses the voltage drop across the emitter resistor R19 of amplifier 110. If this voltage drop across emitter resistor R19 exceeds the threshold 200 mv, it shuts down IC1 for the duration of the square wave pulse that causes this overload, thus protecting transistors Q3 and Q4, as well as other components of the circuit.

When the engine is loaded and IC1 is actuated to produce the boosted "apparent" voltage at terminal T4, that boosted "apparent" voltage is applied to the automobile's standard voltage regulator R shown in FIG. 6. The 1.85 volt greater than actual battery voltage at terminal T4 will cause the voltage regulator to deactivate the field coils of the alternator when the battery is adequately charged, i.e., carrying a charge less than the full 14 v, but at least in the range of about 12.15 v, thus unloading the alternator drain on the engine when the engine is under heavy load conditions. If the sum of the battery voltage plus the 1.85 boost signal voltage at terminal T4 is less than the normal charging point for the automobile's standard voltage regulator R charging voltage threshold, then the voltage regulator R energizes the alternator field coils F in normal linear fashion, charging the battery as required.

When the engine is operating under normal load conditions, such as cruise, the vacuum switch SW1 is pulled to its normally closed (nc) position, deactivating portions of IC1 by applying a nominal battery voltage signal to pin 10. Thus, the 1.85 vdc boost signal voltage is not generated. In this case, a reference voltage that approximates true battery voltage is applied through terminal T3, according to FIG. 8, passing through Diode D4, and is applied to terminal T4, which is connected to the sense terminal of the automobile's standard voltage regulator, according to FIGS. 6 and 7. In this fashion, normal linear charging of the battery is accomplished.

The terminal T8 is provided with a connection to the ON/OFF gate or pin 10 of IC1 to accommodate signals from a different transducer (not shown) where the vacuum switch 80 may be inappropriate. For example, this input could be used to adapt this load management system 50 to a diesel engine by connection to a motion sensor on the throttle linkage or other suitable mechanism or load-related actuating device.

Figure 9:
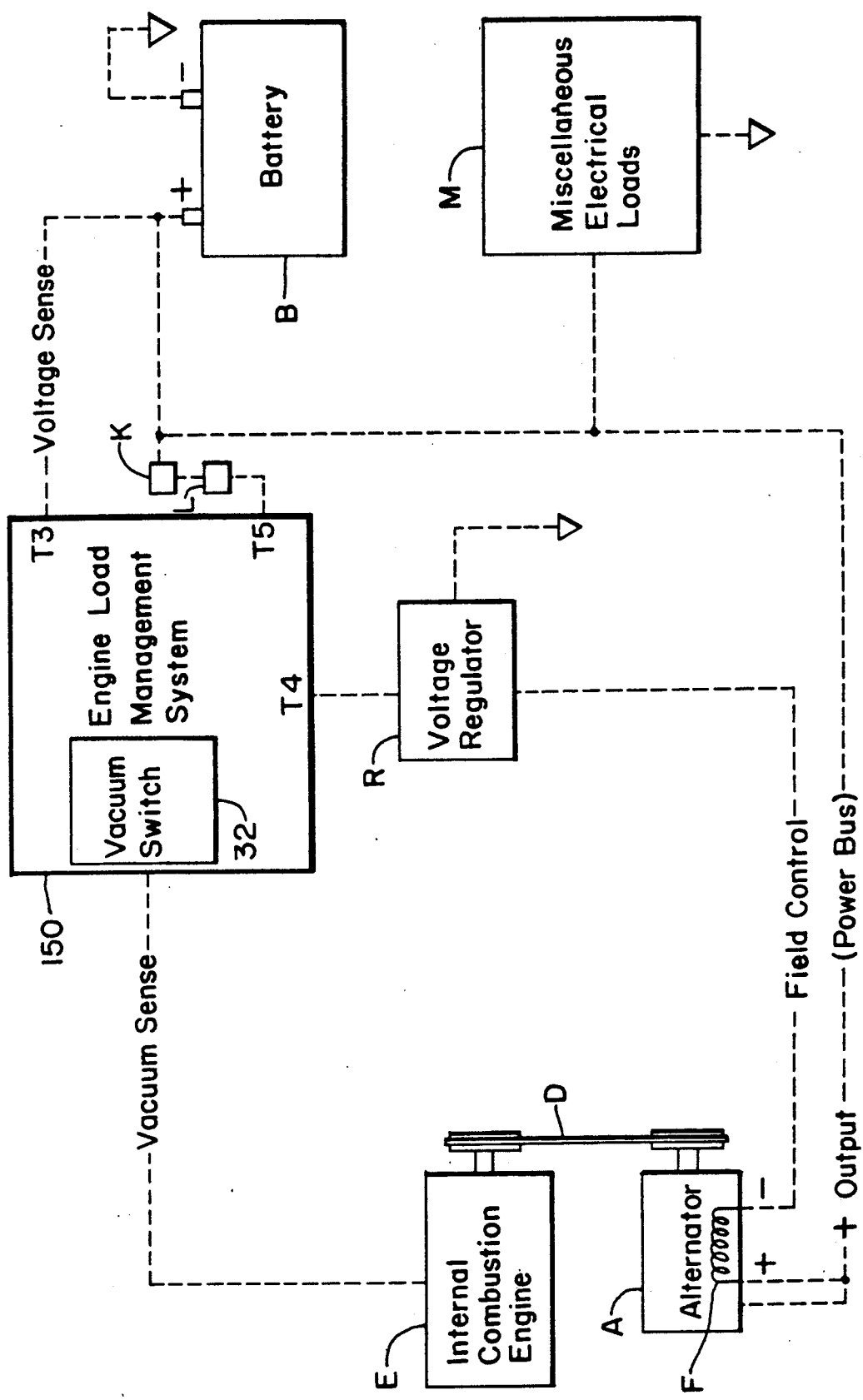
FIG. 9 is a diagrammatic representation of the third preferred embodiment shown in relationship to Bosch-designed alternator systems.
Figure 10:
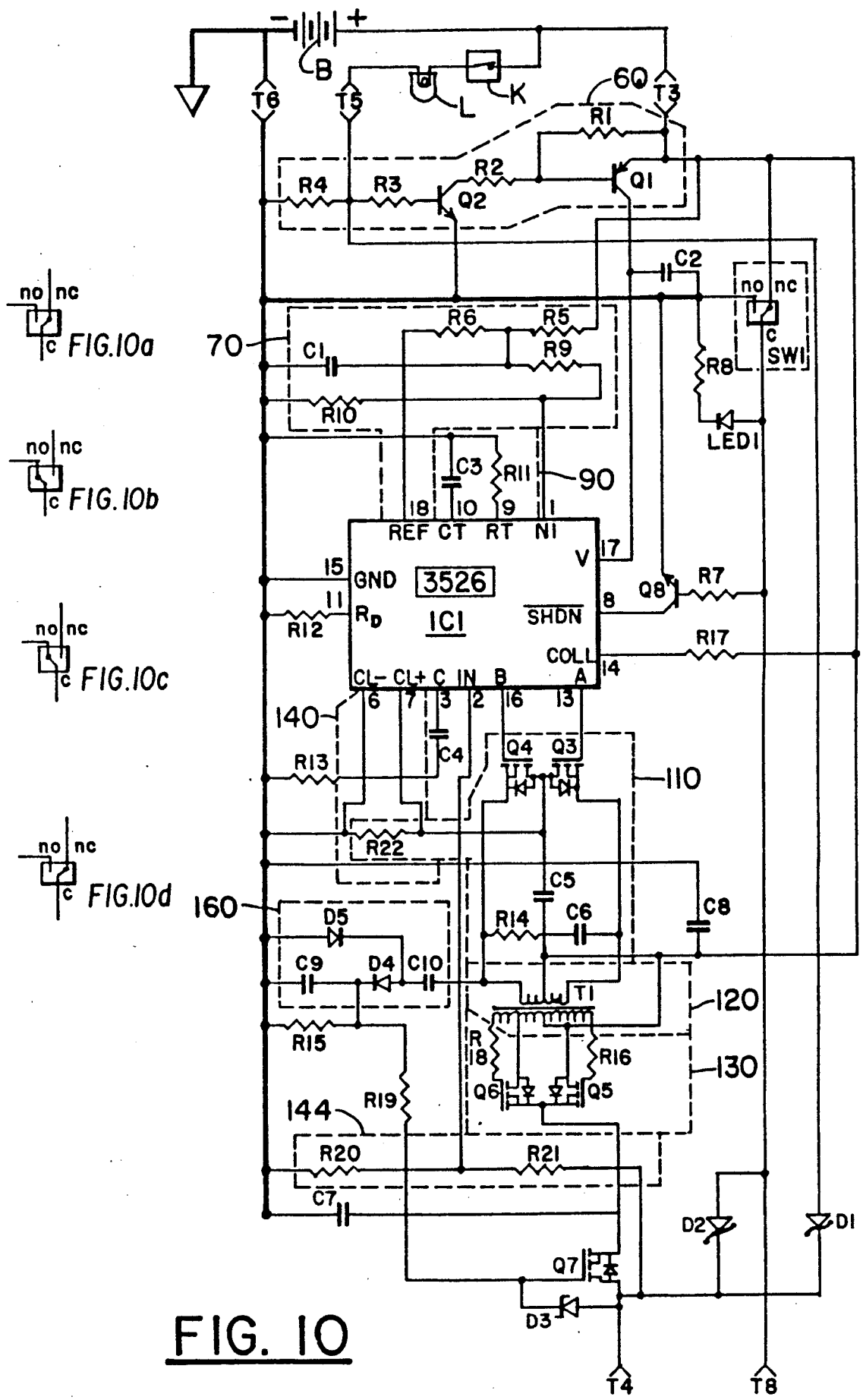
FIG. 10 is a schematic diagram of a third preferred embodiment of the Alter-Break Engine Load Management System for internally-regulated alternator systems, such as those typically designed by Bosch, Inc.

A third preferred embodiment 150 of the present invention, depicted in FIGS. 9-10, is adapted for automotive alternator systems such as those used in Bosch and similar designs. While the third preferred embodiment 150 is similar in approach to the second preferred embodiment, it contains several differences that are required by design differences between Bosch-type alternator systems and General Motors-type alternator systems. As shown in FIG. 9, the voltage regulator R is positioned between the field F and ground in this kind of Bosch system. Also, the Bosch system requires more power to operate the voltage regulator R. Therefore, while the object of this embodiment 150 is still to add a "boost" voltage of about 1.85 v to the normal battery voltage when the engine is under load to "fool" the regulator into shutting down the alternator prematurely, heavier circuit components are required to do so. Therefore, the description of the example circuit for implementing this embodiment 150, as shown in FIG. 10, will be discussed only to the extent that it is different than the circuit in FIG. 8.

According to FIG. 10, battery power is connected to input terminal T3, and terminal T6 is connected to ground. Input terminal T5 is connected through the ignition key switch K to battery power.

When power is applied to terminal T5, transistor Q2 turns on and pulls its collector and the base of PNP transistor Q1 to ground, turning transistor Q1 ON and applying power to pin 17 of Integrated Circuit IC1 (a Regulating Pulse Width Modulator, which may be of type SG3526, manufactured by Signetics, or its functional equivalent. The turned ON transistor Q1 also provides battery voltage bias to the resistors R5, R6, R9 and R10, which function together as a network to provide the voltage reference circuit 70. Capacitor Cl provides smoothing.

The resistor network of the voltage reference circuit 70 comprising resistors R5, R6, R9, and R10 in conjunction with a precision constant voltage on pin 18 divides the battery voltage to a reference of about 3.5 vdc, the precise value of which varies as a function of battery voltage. This reference circuit 70 applies the reference voltage to the non-inverting input pin 1 of the error amplifier stage of the Regulating Pulse Width Modulator IC1. The boosted "apparent" voltage at the output terminal T4 is divided by R20 and R21 in such a manner as to match the reference voltage at pin 1 when the boost voltage is the desired 1.85 v. The divided monitor voltage of circuit 144 between resistors R20 and R21 is applied to the inverting input 2 of IC1.

The two inputs at pins 1 and 2 of IC1 are compared and the comparison is used to set up the pulse width of the square wave generated at the push-pull outputs on pins 13 and 16. These square wave outputs drive the MOSFET transistors Q3 and Q4 of amplifier circuit 110, which powers the step-down output transformer T1. The output of transformer T1 is two half-cycle square waves biased by the battery voltage. The two half-cycle biased square wave outputs are rectified by MOSFETS Q5 and Q6 to create a dc bias (boost) voltage of approximately 1.85 vdc, to be added to the battery voltage from input terminal T3 and delivered to output terminal T4 through MOSFET transistor Q7, which functions as a solid-state switch. Extra windings on the ends of the secondary winding of transformer T1 drive the gates of Q5 and Q6.

The source resistor R22 sets up a current limit voltage for the Regulating Pulse Width Modulator IC1, the threshold of which is 100 mv. Resistor R12 sets up a small deadband to improve the performance of the output transformer T1. Capacitor C3 and resistor R11 determine the operating frequency of the internal oscillator stage of IC1, 120 KHz.

Output of the output transformer T1, as mentioned above, is rectified by synchronous rectifiers (MOSFETS) Q5, Q6, smoothed by Capacitor C7, and fed through MOSFET Q7 to output terminal T4. The voltage doubler circuit 160 taps off the transformer T1 and creates a 25 to 30 volt supply to bias the gate of MOSFET Q7.

Capacitor C5 filters system noise. Resistor R14 and capacitor C6 damp the ringing of the output transformer T1. Capacitor C4 and resistor R13 stabilize the circuitry of the regulating pulse width modulator IC1.

MOSFET transistor Q7 is used to gate the boost voltage at output terminal T4, according to FIG. 10, which is fed to the D+ terminal of the alternator as shown in FIG. 9.

Resistor R15 drains Capacitor C9 at shutdown to protect the output MOSFET Q7.

The vacuum switch SW1 controls MOSFET transistor Q7, which is fully off when vacuum switch SW1 is in its normally open, low-vacuum (high engine load) position. Vacuum switch SW1 also controls Q8. When transistor Q8 is off, the regulating pulse width modulator IC1 is enabled, generating the boost voltage that is applied through MOSFET Q7 to output terminal T4, and generating control voltage in the range of approximately 28 volts for MOSFET Q7.

The vacuum switch SW1 also controls LED1 for indication of the vacuum switch status for installation and adjustment purposes.

Diode D1 allows the normal startup current from keyswitch input terminal T5 to reach the field F of the alternator through output terminal T4 when the engine is not running and little or no vacuum is present.

Diode D2 connects the battery voltage to the alternator field (not shown, but connected through the vehicle's voltage regulator to output terminal T4) when a high vacuum (low engine load condition) is sensed by vacuum switch SW1. This restarts the alternator quickly, minimizing unwanted illumination of the alternator warning light(s).

In all embodiments of the present invention heretofore described, the engine is relieved of either all or a major portion of the load of the alternator, depending on battery charge state, during periods when the engine is under the most strain and is operating in its least efficient regime, provided that the battery is sufficiently charged. During this regime, the engine is receiving fuel that it cannot handle efficiently. By reducing the alternator load on the engine during this regime, acceleration time is reduced, and less fuel is required to accomplish the acceleration. These factors equate directly to better fuel mileage and less atmospheric pollution. Reducing the drag on the accelerating or heavily loaded engine makes significantly more horsepower available to the engine, allowing more power for more rapid acceleration or easier handling of heavy load conditions. However, if the battery charge is not sufficiently high (for instance, if it is under a very high accessory demand), then the alternator field remains excited, and the battery is charged during acceleration or other heavy load periods. When the battery is in a charge condition that is between full (when the alternator is relieved of charging the battery) and minimum (when the alternator will always charge the battery), each embodiment provides for interim charging states for the alternator that partially unload the engine of the alternator drain, improving fuel economy and decreasing atmospheric pollution less than if the alternator were not charging at all, but more than if the alternator were charging at all times. The charging duty cycle of the alternator for each of the preferred embodiments in this interim circumstance decreases linearly as the battery voltage progressively increases.

The first preferred embodiment creates its own linear progression of decreasing alternator duty cycles. The second and third preferred embodiments allow the linear progression cycle inherent in the voltage regulators of the vehicles for which they were designed to continue at appropriate points. In this fashion, an optimum tradeoff between electrical system demand as represented by requirement of the battery for charging by the alternator, and better fuel economy and decreased pollution, achieved through minimizing alternator drag on the engine when the engine is in an inefficient operating range and delaying to the maximum extent possible the alternator drag until the engine enters an efficient operating range, is attained.

Figure 11:
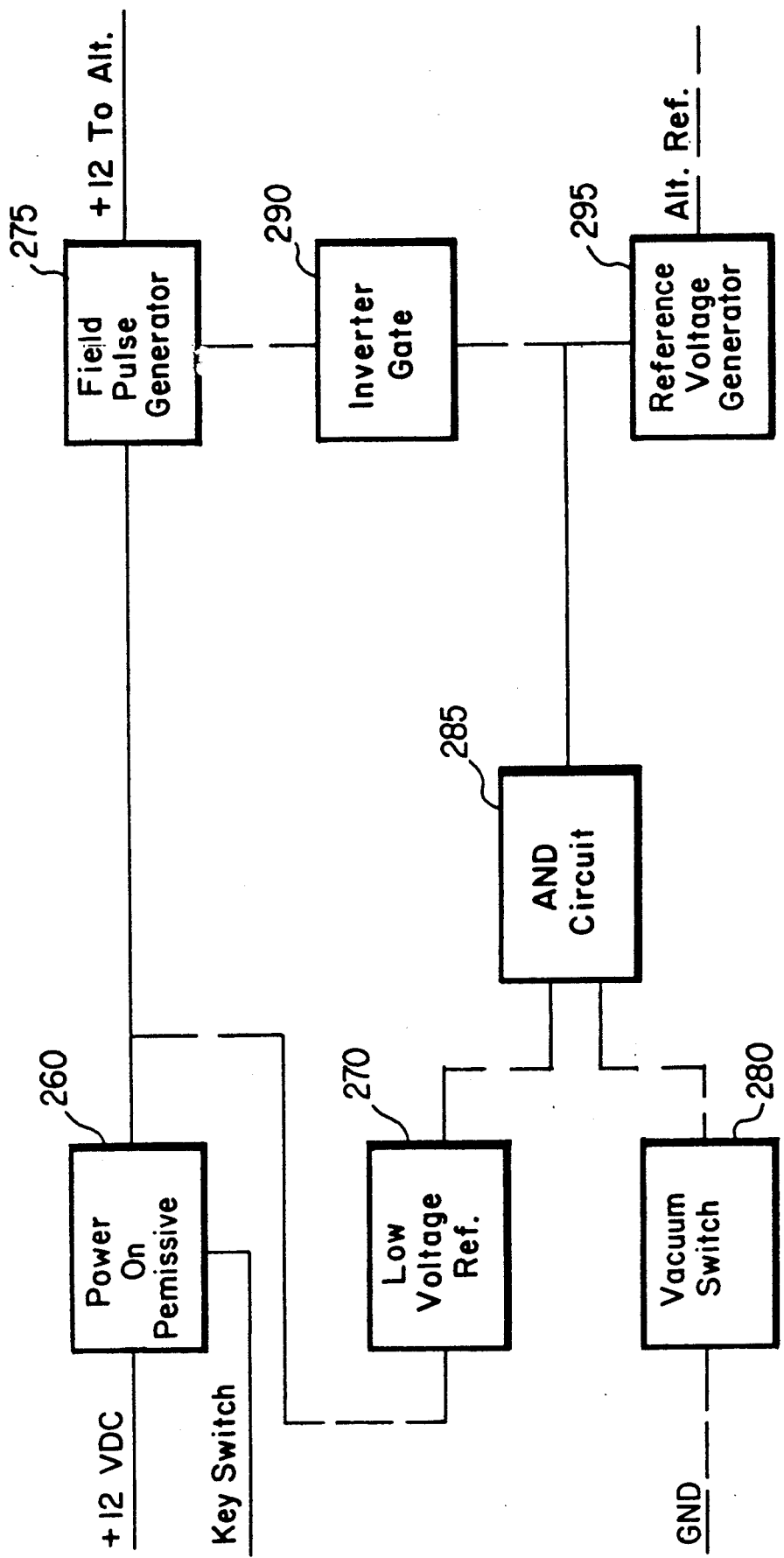
FIG. 11 is a functional block diagram of still another embodiment of the load management system according to this invention adapted for General Motors type alternator charging systems.
Figure 12:
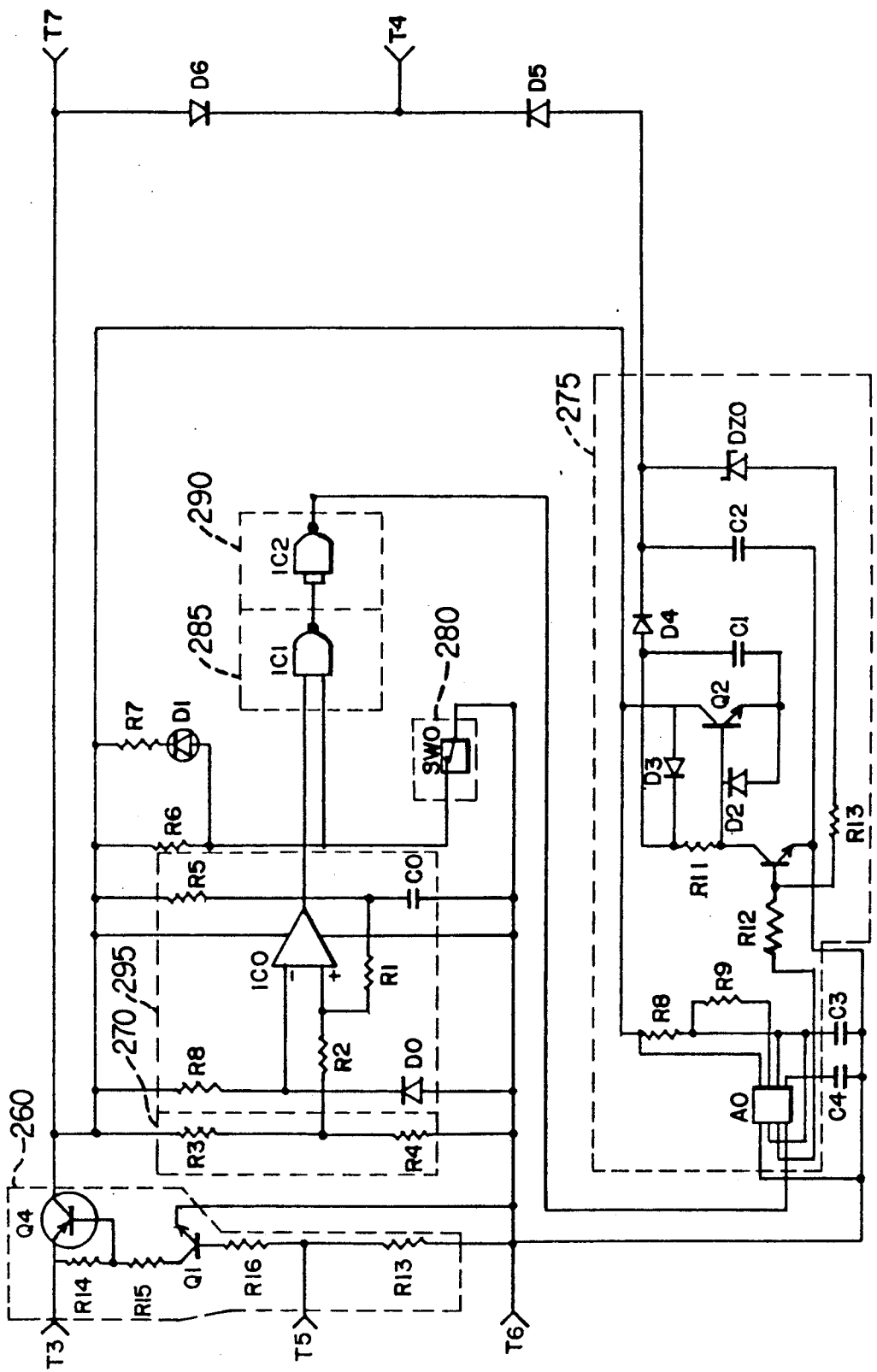
FIG. 12 is an electrical schematic diagram of the embodiment of FIG. 11.

Another, although not preferred, embodiment of the load management system of the present invention for use in conjunction with the General Motors type alternator battery charging systems is shown in FIGS. 11 and 12. The power on permissive switch 260 is actuated by current from the key switch on terminal T5, which turns on transistor Q1. The resulting current drain through R15 turns on Q4, which applies power to the rest of the circuit.

The reference voltage generator 295 is comprised of zener diode D0 and R8, which generates a reference voltage, e.g., about 5 v, and applies this reference voltage to voltage comparator IC0. The low voltage reference 270 is a voltage divider comprised of R3 and R4, which divides down the battery voltage to approximately 5 volts, which is also applied to the comparator IC0. The voltage comparator IC0 compares the reference voltage from D0 and R8 to the low voltage reference from R3 and R4 to establish the state of charge of the battery. These two voltages match at the threshold minimum battery charge, above which the alternator is disabled when the engine is loaded. Therefore, when the divided down battery voltage between R3 and R4 is higher than the reference voltage produced by D0 and R8, the output of IC0 is low. When manifold vacuum is low, i.e., the engine is loaded, the vacuum switch SW0 closes to ground, i.e., goes low, and the AND circuit 285 and inverter gate 290 of IC1 generates a signal to actuate the field pulse generator 275.

The field pulse generator 275 generally includes a timer A0, amplifier Q), a voltage doubler circuit comprised of Q0, Q2, D2, D3, D4, C1, and R11, and a voltage regulator comprising zener diode DZ0. This field pulse generator circuitry 275 produces the boosted apparent voltage, which is limited by DZ0 to about 22 v, and which is applied to terminal T4 through D5. The boosted apparent voltage, which is higher than actual battery voltage, is applied from T4 to the sense input of the automobile's voltage regulator and, as described above, "fools" or induces the voltage regulator to shut down the alternator.

Diode D6 connects the battery voltage to the sense input of the voltage regulator and prevents shorting the boosted apparent voltage back to the battery. D1 is an LED used as a visual indicator of the position of vacuum switch SW0.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalence may be resorted to falling within the scope of the invention as defined by the claims which follow.

The embodiments of the invention in which an exclusive property or privilege is claimed are defined as follows:

1. The method of managing loads on an engine equipped with an alternator-type battery charging system that includes a voltage regulator adapted to shut down the alternator electrical generation functions by turning off electrical current to the alternator field windings when a threshold battery voltage level is reached comprising the steps of:
   sensing the load condition of the engine;
   causing the alternator to decrease or shut down its electrical generation when the engine is under a heavy load, even though the battery is not charged to the threshold level normally set for the voltage regulator to decrease or shut down the alternator electrical generation; and
   establishing an alternative minimum battery voltage threshold, below which it is undesirable to allow the battery to discharge, sensing the voltage level of the battery, and re-exciting the alternator field circuit when the battery discharges to or below said alternative minimum battery voltage threshold, even when the engine is still under heavy load.

2. The method of claim 1, including the steps of establishing a proportional charging range between said alternative minimum battery voltage threshold and an alternator disabling threshold battery voltage level, said alternator disabling threshold being a battery voltage level that is more than said alternate minimum battery voltage level and less than said normal threshold level, and proportionally disabling the field when the battery voltage level is within said proportional charging range in such a manner that the alternator electrical generation increases as the battery voltage level decreases toward said alternate minimum battery voltage threshold and decreases as the battery voltage increases toward alternator disabling threshold.

3. The method of claim 2, including the steps of disabling the field by switching the field excitation current on and off for varying durations.

4. The method of claim 3, including the steps of switching the field excitation circuit continuously "off" when the engine is under heavy load and the battery voltage level is above said alternator disabling threshold, pulsing said field excitation circuit on and off when the battery voltage is in said proportional charging range in such a manner that the duration of the "on" pulses increase and the duration of the "off" pulses decrease as the battery voltage discharges toward said alternate minimum battery voltage level, and switching said field excitation circuit essentially continuously "on" when the battery voltage level discharges below said alternate minimum battery voltage.

5. The method of claim 4, including the steps of generating switching signals for switching the field circuit on and off by generating an oscillating wave form, comparing the oscillating wave form voltage to a voltage representative of the battery voltage level, and generating an "off" signal whenever the battery representative voltage is greater than the oscillating wave form voltage and generating an "on" signal whenever the battery representative voltage is less than the oscillating wave form voltage.

6. The method of claim 5, including the steps of biasing said oscillating wave form with a bias voltage equal to said representative battery voltage when the battery voltage level is at the midpoint of said proportional charging range.

7. The method of claim 6, including the steps of generating said oscillating wave form with an amplitude such that the maximum wave form voltage is equal to the representative battery voltage when the battery voltage level is at said alternator disabling threshold and the minimum wave form voltage is equal to the representative battery voltage when the battery voltage level is at said alternate minimum battery voltage threshold.

8. The method of claim 7, including the steps of generating said bias voltage to remain at a constant predetermined level, and generating said oscillating wave form with a constant predetermined amplitude.

9. The method of claim 8, including the step of generating said oscillating wave form in a triangular wave form configuration.

10. The method of claim 9, including the step of providing said battery representative voltage at a constant fraction of the actual battery voltage such that the said battery representative voltage is less than, but varies in direct proportion to, the actual battery voltage, and providing a light load swamp circuit for swamping said bias voltage with actual battery voltage when the engine is not heavily loaded, thus driving said oscillating wave form above said battery representative voltage and causing the field excitation circuit to be switched constantly "on".

11. The method of claim 10, including the step of sensing the engine load condition by sensing engine manifold vacuum, and actuating said swamp circuit when the manifold vacuum is high and deactuating said swamp circuit when the manifold vacuum is low.

12. The method of managing loads on an engine equipped with an alternator-type battery charging system that includes a voltage regulator adapted to shut down the alternator electrical generation functions by turning off electrical current to the alternator field windings when a threshold battery voltage level is reached, comprising the steps of:
   sensing the load condition of the engine;
   causing the alternator to decrease or shut down its electrical generation when the engine is under a heavy load, even though the battery is not charged to the threshold level normally set for the voltage regulator to decrease or shut down the alternator electrical generation;

producing a boosted apparent voltage that is higher than the actual battery voltage, and feeding said boosted apparent voltage to the voltage regulator instead of the actual battery voltage when the engine is heavily loaded to induce the voltage regulator to decrease electrical generation by the alternator when the voltage regulator would normally allow more electrical generation by the alternator.

13. The method of claim 12, including the step of determining an alternator disabling threshold at a voltage level less than the normal threshold level, and boosting the actual battery voltage by a boost voltage amount equal to the difference between the alternator disabling threshold and the normal threshold level.

14. The method of claim 13, including the steps of boosting the actual battery voltage by generating a pulsed square wave, amplifying the pulsed square wave and driving a center-tapped step-down transformer, biasing the secondary windings of the transformer with the battery voltage level to create two half-cycle square waves having a peak voltage higher than the actual battery voltage, and rectifying and combining the two half-cycle square waves to produce the boosted apparent voltage.

15. The method of claim 14, including the steps of controlling the boost voltage to maintain it equal to the difference between the alternator disabling threshold and the normal threshold level by producing a reference voltage that varies in direct proportion to the actual battery voltage, producing a monitor voltage that also varies as a function of battery voltage, but which is equal to the reference voltage when the boost voltage is at the desired magnitude, comparing the reference voltage and the boost voltage, and using any difference between the reference voltage and the boost voltage to adjust the pulse width of the square wave in such a manner as to bring the monitor voltage into balance with the reference voltage.

16. The method of claim 15, including the steps of turning "on" the square wave generator when the engine is loaded and turning "off" the square wave generator when the engine is not loaded.

17. The method of claim 16, including the steps of sensing the engine manifold vacuum and turning "on" the square wave generator when the manifold vacuum is low and turning off the square wave generator when the manifold vacuum is high.

18. Engine load management apparatus for disabling and enabling an alternator charging system in response to engine loading and unloading in a vehicle that has an engine-powered alternator with field windings, a battery, and a voltage regulator for limiting or shutting down the generation of electricity by the alternator when the battery voltage reaches a predetermined normal maximum charge level, comprising:
   engine load sensor means for sensing load condition of the engine;
   alternator disabling means connected to said engine load sensor means; and
   said alternator disabling means including a variable switch signal generator means for generating switching signals to open and close said field windings in response to engine load conditions.

19. The apparatus of claim 18, wherein said switch signal generator means includes battery voltage sensor means for sensing the actual battery voltage, said switch signal generator means being constructed to generate a switch signal that continuously opens said field circuit when the engine is loaded and the battery voltage is higher than a predetermined alternator disabling threshold, which alternator disabling threshold is lower than said normal maximum charge level.

20. The apparatus of claim 19, wherein said switch signal generator means is also constructed to generate a switch signal that continuously closes said field circuit when the battery voltage is lower than a predetermined alternative minimum voltage threshold, regardless of engine load condition.

21. The apparatus of claim 20, wherein said switch signal generator means is also constructed to generate a pulsed switch signal that causes said field circuit switch means to cycle back and forth between opened and closed modes when the engine is loaded and the battery voltage is between said predetermined alternator disabling threshold and said alternative minimum voltage threshold.

22. The apparatus of claim 21, wherein said switch signal generator means is also constructed to generate a pulsed switch signal that causes the duration of pulses that open the field circuit to be longer when the battery voltage is near said alternator disabling threshold and to decrease in duration as the battery voltage discharges toward said alternative minimum voltage threshold.

23. The apparatus of claim 22, wherein said switch signal generator includes waveform generation means for producing an oscillating waveform, representative sample voltage means for producing a voltage that is representative of the actual battery voltage, and comparator means for comparing the representative battery voltage to the waveform form voltage and producing an "open" field circuit switch signal whenever the representative battery voltage is greater than the waveform voltage and for producing a "close" field circuit switch signal whenever the representative battery voltage is less than the waveform voltage.

24. The apparatus of claim 23, wherein said switch signal generator includes precision voltage reference means for producing a constant precision voltage reference, said oscillating waveform being biased by said precision voltage reference, and said representative sample voltage being equal to said precision voltage reference when the battery voltage is at the midpoint of the range between said alternator disabling threshold and said alternative minimum voltage threshold.

25. The apparatus of claim 24, wherein said waveform generation means generates said oscillating waveform with an amplitude such that the maximum voltage of the biased waveform is equal to the representative battery voltage when the actual battery voltage is equal to said alternator disabling threshold and the minimum voltage of the biased waveform is equal to the representative battery voltage when the actual battery voltage is equal to said alternative minimum threshold.

26. The apparatus of claim 25, wherein said representative battery voltage is a constant fraction of the actual battery voltage.

27. The apparatus of claim 26, wherein said engine load sensor means includes load sensitive switch means for sensing when the engine is not loaded and applying battery voltage to swamp said precision reference voltage-biased waveform to cause said switch signal generator means to generate a constant "closed" mode signal for said field circuit switch means.

28. The apparatus of claim 27, wherein said load sensitive switch means includes a vacuum switch connected to the manifold vacuum of the engine and configured to connect the battery voltage to said oscillating waveform when the manifold vacuum is high.

29. Engine load management apparatus for disabling and enabling an alternator charging system in response to engine loading and unloading in a vehicle that has an engine-powered alternator with field windings, a battery, and a voltage regulator for limiting or shutting down the generation of electricity by the alternator when the battery voltage reaches a predetermined normal maximum charge level, comprising:

engine load sensor means for sensing load condition of the engine;

alternator disabling means connected to said engine load sensor means; and said alternator disabling means includes boost voltage generator means for producing a boosted apparent voltage that is higher than the actual voltage for inducing the voltage regulator to decrease electrical generation by the alternator when there is a load on the engine and the actual battery voltage is less than the normal maximum charge level.

30. The apparatus of claim 29, wherein said boost voltage generator means is constructed to boost the actual battery voltage by a predetermined incremental boost voltage.

31. The apparatus of claim 30, wherein said alternator disabling means includes square wave generator means for producing a pulsed square wave, and wherein said boost voltage generator means includes amplifier means for amplifying said pulsed square wave, step down center-tapped transformer means for producing two half-cycle square waves biased by the actual battery voltage and rectifier means for rectifying and joining said two half-cycle biased square waves together to produce said boosted apparent voltage.

32. The apparatus of claim 31, including boost voltage level control means for maintaining the boost voltage at a predetermined amount to produce a boosted apparent voltage at the predetermined incremental level above the actual battery voltage.

33. The apparatus of claim 32, wherein said boost level voltage control means includes precision voltage reference means for producing a voltage that varies in direct proportion to the actual battery voltage, boost voltage monitor means tapped into the boosted apparent voltage for producing a divided down monitor voltage that is a constant fraction of the boosted apparent voltage and which is equal to said precision voltage reference when the boosted apparent voltage is at the desired incremental boost voltage amount above the actual battery voltage, and comparator means for comparing said precision voltage reference with said monitor voltage and using any difference to adjust the square wave generator to change the square wave in such a manner as to bring the monitor voltage into balance with the precision voltage reference.

34. The apparatus of claim 33, wherein said engine load sensor means includes load-sensitive switch means connected to said square wave generator means for actuating said square wave generator to produce said pulsed square wave when the engine is loaded.

35. The apparatus of claim 34, wherein said loadsensitive switch means includes a vacuum switch connected to the manifold vacuum of the engine and configured to actuate said square wave generator when the manifold vacuum is low and to deactuate said square wave generator when the manifold vacuum is high.

* * * * *